US008992303B2

(12) United States Patent
Sakurai et al.

(10) Patent No.: US 8,992,303 B2
(45) Date of Patent: Mar. 31, 2015

(54) STORAGE MEDIUM, GAME APPARATUS, GAME CONTROLLING METHOD AND GAME SYSTEM

(75) Inventors: Masahiro Sakurai, Tokyo (JP); Michiko Sakurai, Tokyo (JP); Kou Otani, Tokyo (JP); Nagi Koike, Tokyo (JP); Nobuhiro Yamasaki, Tokyo (JP)

(73) Assignee: Nintendo Co., Ltd., Kyoto (JP)

( * ) Notice: Subject to any disclaimer, the term of this patent is extended or adjusted under 35 U.S.C. 154(b) by 226 days.

(21) Appl. No.: 13/156,779

(22) Filed: Jun. 9, 2011

(65) Prior Publication Data

US 2011/0312407 A1    Dec. 22, 2011

(30) Foreign Application Priority Data

Jun. 10, 2010   (JP) ................................. 2010-133040

(51) Int. Cl.
A63F 9/24        (2006.01)
A63F 13/40       (2014.01)

(52) U.S. Cl.
CPC ........... *A63F 13/10* (2013.01); *A63F 2300/204* (2013.01)
USPC ....................................................... 463/23

(58) Field of Classification Search
CPC .............................................. A63F 2300/6027
USPC ....................................................... 463/23
See application file for complete search history.

(56) References Cited

U.S. PATENT DOCUMENTS

| 8,317,600 B2 * | 11/2012 | Hazama et al. .................. 463/23 |
| 2007/0060230 A1 | 3/2007 | Kang et al. |
| 2007/0060409 A1 | 3/2007 | Cho et al. |
| 2009/0278974 A1 | 11/2009 | Kuwahara et al. |

FOREIGN PATENT DOCUMENTS

| JP | 3392120 | 1/2003 |
| JP | 2006-110203 | 4/2006 |
| JP | 2008-259619 | 10/2008 |
| WO | WO2009/038167 | * 3/2009 |

OTHER PUBLICATIONS

Patch 1.10 (Diablo II). Diablo Wiki. Online. Accessed via the Internet. Accessed Mar. 20, 2013. <URL: http://diablo.wikia.com/wiki/Patch_1.10_(Diablo_II)>.*
Gold. Diablo Wiki. Online. Accessed via the Internet. Accessed Mar. 20, 2013. <URL:http://diablo2.diablowiki.net/Gold>.*

(Continued)

*Primary Examiner* — Dmitry Suhol
*Assistant Examiner* — Carl V Larsen
(74) *Attorney, Agent, or Firm* — Nixon & Vanderhye, P.C.

(57) ABSTRACT

A game apparatus includes a CPU, and the CPU displays a difficulty level setting screen on a second LCD prior to a start of the virtual game. On the difficulty level setting screen, a player sets a difficulty level so as to be higher or lower than an initial value by using coins that a player character obtains by playing a virtual game. For example, in a case that the difficulty level is high, the virtual game is made difficult, but a possibility of obtaining a rare item is made high. On the other hand, in a case that the difficulty level is low, the virtual game is made easy, but a possibility of obtaining a rare item is made low.

15 Claims, 13 Drawing Sheets

(56) References Cited

OTHER PUBLICATIONS

Player Settings. Diablo Wiki. Onelin. Accessed via the Internet. Accessed Mar. 20, 2013. <URL:http://diablo2.diablowiki.net/Player_Settings>.*

Diablo II Game Manual PC. Blizzard Entertainment. 2000. Accessed via the Internet. Accessed Mar. 20, 2013. <URL:http://www.replacementdocs.com/download.php?view.2102>.*

Finished Level Guides: Level 45-55 Guide Event. OGPlanet.com. Online. May 15, 2010. Accessed via the Internet. Accessed Oct. 19, 2013. <URL:http://nforum.ogplanet.com/latale/printer_friendly_posts.asp?TID=154396&SID=3ffa598ez2934b47dc29634b82ac82b9>.*

Japanese Office Action w/English translation dated May 20, 2014 in Japanese Application No. 2010-133040 (7 pages total).

Konami, "Proyakyu Spirits 3 Official Guide Complete Edition", Konami Digital Entertainment Co., Ltd., 2006, Japan, ISBN4-86155-114-5 C0076 (19 pages).

Falcom, "ZWEI II Official Perfect Guide", Feb. 17, 2009, Japan, ISBN978-4-7753-0663-5 C0076 (13 pages).

* cited by examiner (A) TOP VIEW (FOLDED STATE)

(B) LEFT SIDE VIEW (FOLDED STATE)

FIG. 7

DIFFICULTY LEVEL SETTING TABLE

| DIFFICULTY LEVEL | THE NUMBER OF INSERTED COINS |
|---|---|
| 0 | 20 |
| 1 | 10 |
| 2 (INITIAL VALUE) | 0 |
| 3 | 5 |
| 4 | 8 |
| 5 | 12 |
| 6 | 18 |
| 7 | 25 |
| 8 | 35 |
| 9 | 50 |

STORAGE MEDIUM, GAME APPARATUS, GAME CONTROLLING METHOD AND GAME SYSTEM

CROSS REFERENCE OF RELATED APPLICATION

The disclosure of Japanese Patent Application No. 2010-133040 filed on Jun. 10, 2010 is incorporated herein by reference.

BACKGROUND OF THE INVENTION

1. Field of the Invention

The present invention relates to a storage medium, a game apparatus, a game controlling method, and a game system. More specifically, the present invention relates to a storage medium, a game apparatus, a game controlling method and a game system which change a difficulty level of a game according to an operation by a player.

2. Description of the Related Art

One example of a related art is disclosed in a Japanese Patent Application Laying-open No. 2006-110203 (document 1) laid-open on Apr. 27, 2006. In a game apparatus of the document 1, it is determined whether or not a memory card is attached, and if the memory card is not attached, a simple mode is chosen as an initial setting mode. On the other hand, in a case that the memory card is attached to the game apparatus, it is further determined whether or not there is designation data. In a case that there is designation data, a mode corresponding thereto is chosen as an initial setting mode, and in a case that there is no designation data, a normal mode is chosen as an initial setting mode. The modes thus chosen automatically can be changed by the user.

Furthermore, another example of the related art is disclosed in Japanese Patent No. 3392120 (document 2) registered on Jan. 24, 2003. The game apparatus of the document 2 evaluates a game operation by the player, and automatically changes the difficulty level of the game operation during the game in correspondence with the evaluation.

In game apparatus disclosed in the document 1, the player can set the difficulty level of his or her own will. Furthermore, in the game apparatus disclosed in the document 2, the difficulty level is automatically changed. A conventional difficulty level changing function was either one of them.

SUMMARY OF THE INVENTION

Therefore, it is a primary object of the present invention to provide a storage medium, a game apparatus, and a game controlling method having a novel difficulty level changing function.

Furthermore, another object of the present invention is to provide a storage medium, a game apparatus, and a game controlling method capable of enhancing a willingness to challenge of advanced players.

Additionally, a further object of the present invention is to provide a storage medium, a game apparatus and a game controlling method capable of being enjoyed by beginners as well as advanced players.

The present invention attains at least one of the aforementioned objects.

A first invention is a storage medium storing a game program, the game program causes a processor of a game apparatus to function as a success judger, a point storage, a difficulty level increase acceptor, and a difficulty level increaser. The success judger advances a game according to an operation by a player and judges whether or not the game succeeds. For example, in a case that a player character defeats an enemy character, or in a case that an attack by the player character hits the enemy character, it is judged that the game succeeds. The judgment that the game succeeds may be variably decided depending on the contents of the games, and in other examples, it may be judged that the game succeeds in a case that the player can get points or win the game against an opposing team in a sports game, can play well in a music game, and finishes at the top or finishes at a constant time or less in a racing game. The point storage decides a point to be given and accumulatively stores point data corresponding to the point in a storage when the success judger judges that the game succeeds. The difficulty level increase acceptor accepts an operation by the player for increasing a difficulty level of the game prior to start of the game. Then, the difficulty level increaser performs a subtraction from points indicated by the point data stored in the storage, and increases the difficulty level of the game when the difficulty level increase acceptor accepts an operation by the player for increasing the difficulty level of the game.

According to the first invention, the difficulty level is increased by using the points obtained by succeeding in the game, and therefore, it is possible to provide a game having a novel difficulty level changing function. Furthermore, the choice between the increase and the decrease of the difficulty level is arbitrarily performed by the player, and therefore, a wide variety of players from beginners to advanced players can enjoy playing the game as well. In addition, the player need to succeed in the game to save points for increasing the difficulty level, and thus daringly increases the difficulty level by consuming the points by his or her own will, and therefore, increasing the difficulty level itself becomes a status, and this brings a feeling of satisfaction to advanced players. From the foregoing, a wide variety of players from beginners to advanced players can enjoy playing the game, and the user community playing the virtual game is widened, and the generation which plays the game is widened. Then, this can also contribute to communications between a wide spectrum of users (between generations) through topics in relation to the virtual game.

A second invention is according to the first invention, wherein the game program causes a processor to further function as a game element processor. The game element processor makes a predetermined game element appear in the game, or raises a possibility of making the predetermined game element appear in the game when the difficulty level increase acceptor accepts an operation by the player for increasing the difficulty level of the game. The game element is a game item, a game character, a game stage, etc. In this invention, for example, a new character is made to appear in the virtual space, and a frequency of appearance of the rare item is made to high. More specifically, out of game elements defined in advance in the game software, a game element which has not been an object to appear may be made to appear, or a probability of appearance of the game element which has been set to be low may be raised.

According to the second invention, when the difficulty level is increased, a predetermined game element is made to appear in the game, or a probability of making the game element appear is raised. This can be a motivation to daringly consume the points obtained in the game to thereby increase the difficulty level, and this can give a challenge to the advanced players and motivates the beginners to challenge the game by increasing the difficulty level.

A third invention is according to the first invention, wherein the game program causes the processor to further function as a game-over judger, a re-playing acceptor, and a first difficulty level decreaser. The game-over judger judges whether game over of the game or not. The re-playing acceptor accepts an operation by the player as to whether or not the game is played again when the game-over judger judges that the game is over. That is, an acceptance of a so-called "continue" is performed. The first difficulty level decreaser decreases the difficulty level of the game in relation to the play which has been increased by the difficulty level increaser when the re-playing acceptor accepts an operation by the player indicating that the game is to be played again.

According to the third invention, when re-playing is chosen, the difficulty level is decreased. Thus for the advanced players, this becomes a penalty because the difficulty level which has been increased by purposely consuming the points is decreased, and this motivate the player to challenge the game again to overcome the penalty. Furthermore, for the beginners, a willingness to re-play is enhanced because the difficulty level is decreased in the re-playing.

A fourth invention is according to the first invention, wherein the game program causes the game processor to further function as a difficulty level decrease acceptor and a second difficulty level decreaser. The difficulty level decrease acceptor accepts an operation by the player for decreasing the difficulty level of the game prior to a start of the game. The second difficulty level decreaser performs a subtraction from the points indicated by the point data stored in the storage, and decreases the difficulty level of the game when the difficulty level decrease acceptor accepts an operation by the player to decrease the difficulty level of the game.

According to the fourth invention, for example, the advanced players can increase the difficulty level, and the beginners can decrease the difficulty level, so that it is possible for anyone from the beginners to the advanced players to enjoy playing the game. For example, by decreasing the difficulty level by the beginners with the use of the points obtained by the advanced player, the game can also be played, and therefore, it is possible for the beginners and the advanced players to cooperatively enjoy the same game together.

A fifth invention is according to the fourth invention, wherein the game program causes the processor to further function as a game-over judger, a re-playing acceptor, and a difficulty level adjuster. The game-over judger judges whether game over of the game or not. The re-playing acceptor accepts an operation by the player as to whether the game is to be played again when the game-over judger judges that the game is over. The difficulty level adjuster decreases the difficulty level of the game to be played again when the game for which the difficulty level has been increased by the difficulty level increaser is over, and does not change the difficulty level of the game to be played again when the game for which the difficulty level has been decreased by the second difficulty level decreaser is over, at a time when the re-playing acceptor accepts an operation by the player indicating that the game is played again.

According to the fifth invention, when re-playing is chosen, in a case that the difficulty level has been increased by using the points, the difficulty level is decreased, resulting in a penalty for the advanced players, and in a case that the difficulty level has been decreased by using the points, the difficulty level is not be changed, resulting in a wide-ranging virtual game for the beginners. That is, it is possible for anyone from the beginners to the advanced players to enjoy playing the game.

A sixth invention is according to the first invention, wherein the point storage makes a value of points to be given great as the difficulty level of the game becomes high. For example, even if the player character defeats the same kind of enemy character, the points to be given is different from the difficulty level to the difficulty level.

According to the sixth invention, this becomes a motivation to increase the difficulty level, and therefore, it is possible to enjoy playing the game.

A seventh invention is according to the first invention, wherein the game program causes the processor to further function as a player character controller and an enemy character controller. The player character controller controls an action of a player character according to an operation by the player. For example, the player character controller moves the player character and causes the player character to perform an arbitrary action according to an operation (instruction) by the player. The enemy character controller controls an action of an enemy character. For example, the enemy character controller moves the enemy character and causes the enemy character to perform an arbitrary action irrespective of an operation by the player. The success judger judges whether or not an attack action against the enemy character by the player character controlled by the player character controller is successful. Furthermore, the point storage decides a value of points, and accumulatively stores point data corresponding to the points in the storage when the success judger judges that an attack action against the enemy character by the player character is successful.

According to the seventh invention, the point is decided in correspondence with the kind of the enemy character and the difficulty level, for example, and if the point is set to be large as the difficulty level is made high, it becomes possible to enhance a willingness to increase the difficulty level.

An eighth invention is according to the seventh invention, wherein the game program causes the game processor to further function as an experience point storage, a level increaser, and an ability value increaser. The level increaser increases the level of the player character when the experience point indicated by the experience point data stored in the storage becomes equal to or more than a predetermined value. The experience point storage decides an experience point to be given to the player character and accumulatively stores experience point data corresponding to the experience point in the storage when the success judger judges that an attack action against the enemy character by the player character is successful. The ability value increaser increases an ability value of the player character when the level increaser increases the level of the player character.

According to the eighth invention, by obtaining the experience point, the level of the player character is increased, and therefore, if the experience point to be obtained is made large as the difficulty level becomes higher, it becomes possible to enhance a willingness to increase the difficulty level, such as a desire to increase the ability value of the player character rapidly.

A ninth invention is according to the eighth invention, wherein the difficulty level increaser makes a point to be subtracted large as the level becomes high.

According to the ninth invention, by making the difficulty level high, a large experience point is obtained to thereby increase the level of the player. Thus, it becomes possible for the player to obtain a large point, and increase the difficulty level, capable of enhancing a willingness to increase the difficulty level.

A tenth invention is according to the first invention, wherein the difficulty level increase acceptor accepts an operation by the player for designating points to be used for increasing the difficulty level out of the points indicated by the point data. Furthermore, the difficulty level increaser subtracts the points designated by the operation by the player accepted by the difficulty level increase acceptor, and changes a degree of increase of the difficulty level depending on the points.

According to the tenth invention, a degree of increase of the difficulty level can be changed depending on the points, and thus, if the points to be subtracted is set to be large as the difficulty level is high, the player cannot play the game at the high difficulty level from the beginning of the game, and thus, the player can challenge the game of a high difficulty level after acquiring a certain degree of experience.

An eleventh invention is according to the eighth invention, wherein the difficulty level increase acceptor accepts an operation by the player for designating points to be used for increasing the difficulty level out of the points indicated by the point data. The difficulty level increaser subtracts the points designated by the operation by the player accepted by the difficulty level increase acceptor, changes a degree of increase of the difficulty level depending on the points, and makes an upper limit of useable points large as the level of the player character becomes high. For example, as the degree of increase of the difficulty level is made large, the point to be subtracted is made more.

According to the eleventh invention, if the level of the player character is made high, the degree of increase of the difficulty level is made large, and therefore, it is possible to make the player challenge the game of a high difficulty level.

A twelfth invention is according to the seventh invention, wherein the difficulty level increaser changes at least one of an attribute and a frequency of appearance of the enemy character.

According to the twelfth invention, by increasing the difficulty level, the attribute of the enemy character and the frequency of appearance of the enemy character are changed, and therefore, it is possible to motivate the player to increase the difficulty level.

A thirteenth invention is according to the second invention, wherein the game program causes the processor to further function as a game element obtainment acceptor and a game element use setter. The game element obtainment acceptor accepts an operation by the player for obtaining the game element. The game element use setter performs a subtraction from the points indicated by the point data stored in the storage, and sets the game element to be useable in the game when an operation by the player for obtaining the game element is accepted by the game element obtainment acceptor. For example, the player character buys (obtains) items as game elements in the game by using points, and regards them as possessed items.

According to the thirteenth invention, by using the points useable in the game, it is possible to increase the difficulty level of the game.

A fourteenth invention is a game apparatus, comprising: a success judger which advances a game according to an operation by a player and judges whether or not the game succeeds; a point storage which decides a point to be given and accumulatively stores point data corresponding to the point in a storage when the success, judger judges that the game succeeds; a difficulty level increase acceptor which accepts an operation by the player for increasing a difficulty level of the game prior to start of the game; and a difficulty level increaser which performs a subtraction from points indicated by the point data stored in the storage and increases the difficulty level of the game when the difficulty level increase acceptor accepts an operation by the player for increasing the difficulty level of the game.

In the fourteenth invention as well, similar to the first invention, it is possible to provide a game having novel difficulty level changing function, and it is possible for anyone from the beginners to the advanced players to enjoy playing the game.

A fifteenth invention is a game controlling method of an information processing apparatus, including following steps of: (a) advancing a game according to an operation by a player and judging whether or not the game succeeds; (b) deciding a point to be given and accumulatively storing point data corresponding to the point in a storage when the step (a) judges that the game succeeds; (c) accepting an operation by the player for increasing a difficulty level of the game prior to start of the game; and (d) performing a subtraction from points indicated by the point data stored in the storage and increasing the difficulty level of the game when the step (c) accepts an operation by the player for increasing the difficulty level of the game.

According to the fifteenth invention as well, similar to the first invention, it is possible to provide a game having novel difficulty level changing function, and it is possible for anyone from the beginners to the advanced players to enjoy playing the game.

A sixteenth invention is a game system comprising: a success judger which advances a game according to an operation by a player and judges whether or not the game succeeds; a point storage which decides a point to be given and accumulatively stores point data corresponding to the point in a storage when the success judger judges that the game succeeds; a difficulty level increase acceptor which accepts an operation by the player for increasing a difficulty level of the game prior to start of the game; and a difficulty level increaser which performs a subtraction from points indicated by the point data stored in the storage, and increases the difficulty level of the game when the difficulty level increase acceptor accepts an operation by the player for increasing the difficulty level of the game.

In the sixteenth invention as well, similar to the first invention, it is possible to provide a game having a novel difficulty level changing function, and it is possible for anyone from the beginners to the advanced players to enjoy playing the game.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 7 is an illustrative view showing an example of a difficulty level setting table according to difficulty level setting table data shown in FIG. 6;

DETAILED DESCRIPTION OF THE PREFERRED EMBODIMENTS

Figure 1:
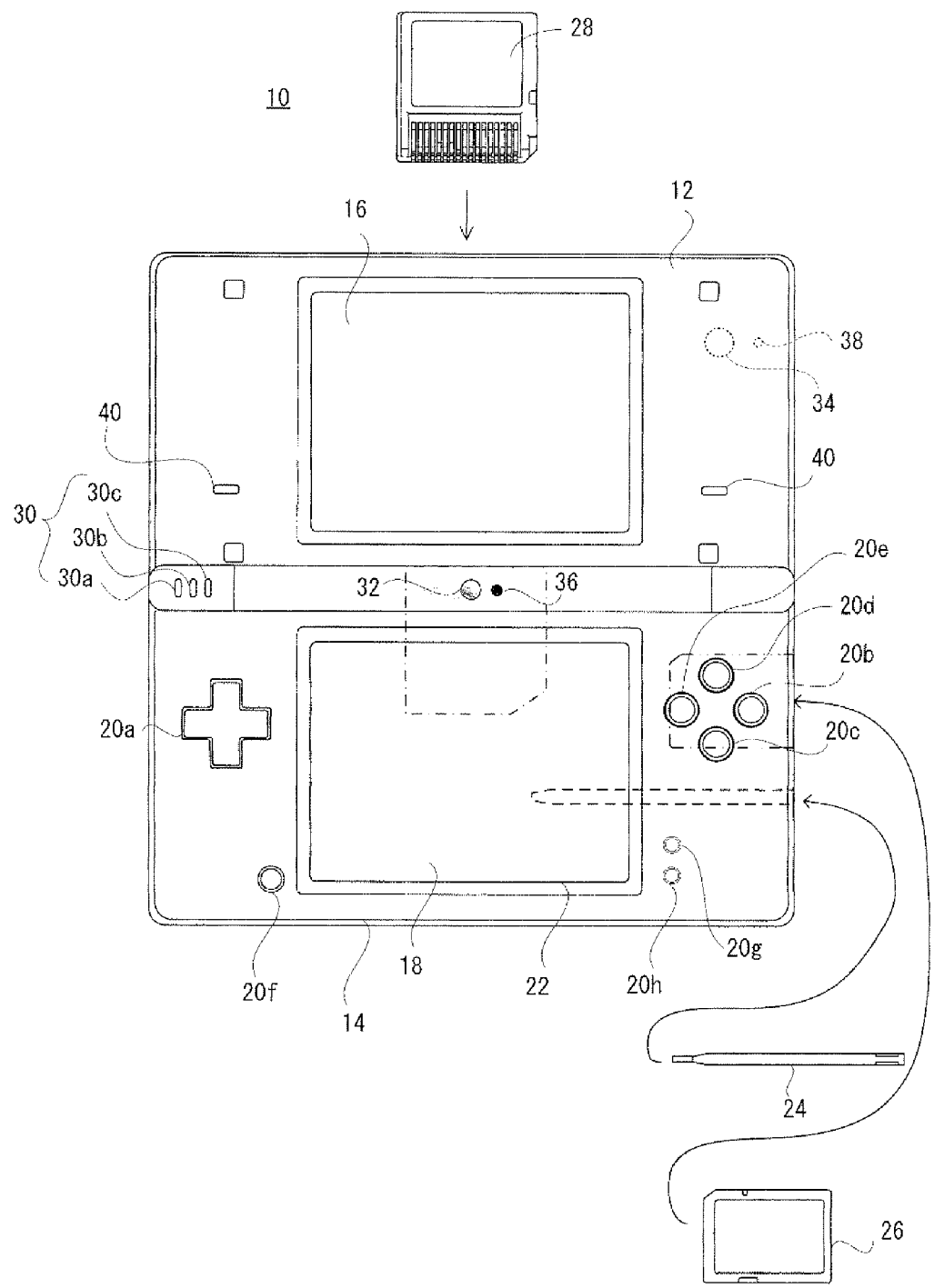
FIG. 1 is an illustrative view showing one embodiment of an external configuration of a game apparatus of this invention.

Referring to FIG. 1, a game apparatus 10 of one embodiment of the present invention includes an upper housing 12 and a lower housing 14, and the upper housing 12 and the lower housing 14 are connected with each other so as to be opened or closed (foldable). In FIG. 1 example, the upper housing 12 and the lower housing 14 are constructed in the form of a horizontally long rectangular plate, and are rotatably connected with each other at the long sides of both of the housings. That is, the game apparatus 10 of this embodiment is a folding handheld game apparatus, and in FIG. 1, the game apparatus 10 is shown in an opened state (in an open state). The game apparatus 10 is constructed such a size that the user can hold with both hands or one hand even in the open state.

Generally, the user uses the game apparatus 10 in the open state. Furthermore, the user keeps the game apparatus 10 in a close state when not using the game apparatus 10. Here, the game apparatus 10 can maintain an opening and closing angle formed between the upper housing 12 and the lower housing 14 at an arbitrary angle between the close state and open state by a friction force, etc. exerted at the connected portion as well as the aforementioned close state and open state. That is, the upper housing 12 can be fixed with respect to the lower housing 14 at the arbitrary angle.

Additionally, the game apparatus 10 is mounted with cameras (32, 34) described later, functioning as an imaging device, such as imaging an image with the cameras (32, 34), displaying the imaged image on the screen, and saving the imaged image data.

As shown in FIG. 1, the upper housing 12 is provided with a first LCD 16, and the lower housing 14 is provided with a second LCD 18. The first LCD 16 and the second LCD 18 take a horizontally-long shape, and are arranged such that the directions of the long sides thereof are coincident with the long sides of the upper housing 12 and the lower housing 14. For example, resolutions of the first LCD 16 and the second LCD 18 are set to 256 (horizontal)×192 (vertical) pixels (dots).

In addition, although an LCD is utilized as a display in this embodiment, an EL (Electronic Luminescence) display, a plasmatic display, etc. may be used in place of the LCD. Furthermore, the game apparatus 10 can utilize a display with an arbitrary resolution.

Figure 2:
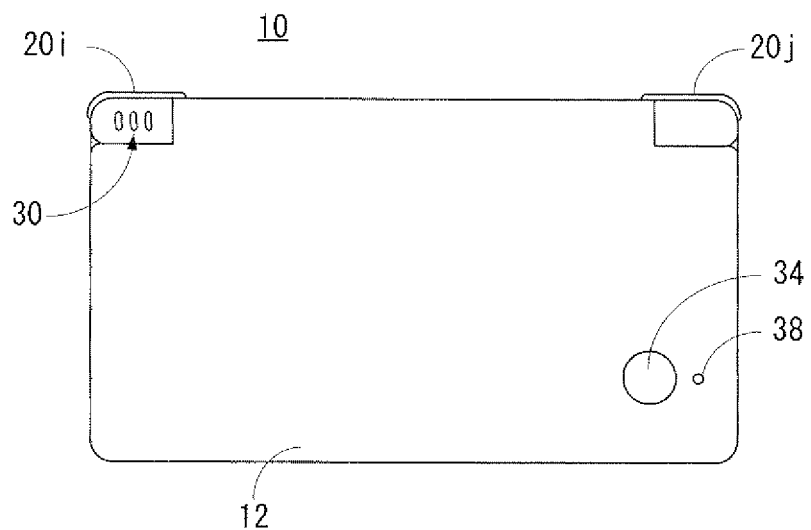
FIG. 2 is an illustrative view showing a top view and a left side view of the game apparatus shown in FIG. 1 in a folded manner.
Figure 2:
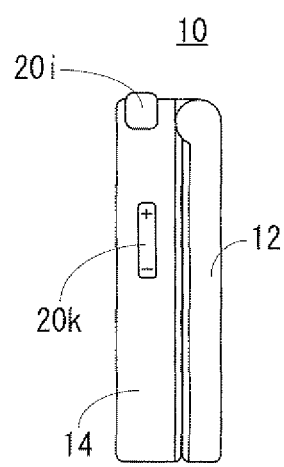

As shown in FIG. 1 and FIG. 2, the lower housing 14 is provided with respective operation buttons 20a-20k as input devices. Out of the respective operation buttons 20a-20k, the direction input button 20a, the operation button 20b, the operation button 20c, the operation button 20d, the operation button 20e, the power button 20f, the start button 20g, and the select button 20h are provided on the surface (inward surface) to which the second LCD 18 of the lower housing 14 is set. More specifically, the direction input button 20a and the power button 20f are arranged at the left of the second LCD 18, and the operation buttons 20b-20e, 20g and 20h are arranged at the right of the second LCD 18. Furthermore, when the upper housing 12 and the lower housing 14 are folded, the operation buttons 20a-20h are enclosed within the game apparatus 10.

The direction input button (cross key) 20a functions as a digital joystick, and is used for instructing a moving direction of a player object, moving a cursor, and so forth. Each operation buttons 20b-20e is a push button, and is used for causing the player object to make an arbitrary action, executing a decision and cancellation, and so forth. The power button 20f is a push button, and is used for turning on or off the main power supply of the game apparatus 10. The start button 20g is a push button, and is used for temporarily stopping (pausing), starting (restarting) a game, and so forth. The select button 20h is a push button, and is used for a game mode selection, a menu selection, etc.

Although operation buttons 20i-20k are omitted in FIG. 1, as shown in FIG. 2 (A), the operation button (L button) 20i is provided at the left corner of the upper side surface of the lower housing 14, and the operation button (R button) 20j is provided at the right corner of the upper side surface of the lower housing 14. Furthermore, as shown in FIG. 2 (B), the volume button 20k is provided on the left side surface of the lower housing 14.

FIG. 2 (A) is an illustrative view of the game apparatus 10 in a folded manner as seen from a top surface (upper housing 12). FIG. 2 (B) is an illustrative view of the game apparatus 10 in a folded manner when seen from a left side surface.

The L button 20i and the R button 20j are push buttons, and can be used for similar operations to those of the operation buttons 20b-20e, and can be used as subsidiary operations of these operation buttons 20b-20e. Furthermore, in this embodiment, the L button 20i and the R button 20j can also be used for an operation of an imaging instruction (shutter operation). The volume button 20k is made up of two push buttons, and is utilized for adjusting the volume of the sound output from two speakers (right speaker and left speaker) not shown. In this embodiment, the volume button 20k is provided with an operating portion including two push portions, and the aforementioned push buttons are provided by being brought into correspondence with the respective push portions. Thus, when the one push portion is pushed, the volume is made high, and when the other push portion is pushed, the volume is made low. For example, when the push portion is hold down, the volume is gradually made high, or the volume is gradually made low.

Returning to FIG. 1, the game apparatus 10 is further provided with a touch panel 22 as an input device separate from the operation buttons 20a-20k. The touch panel 22 is attached so as to cover the screen of the second LCD 18. In this embodiment, a touch panel of a resistance film system is used as the touch panel 22, for example. However, the touch panel 22 can employ an arbitrary push-type touch panel without being restricted to the resistance film system. Furthermore, in this embodiment, as the touch panel 22, a touch panel having the same resolution (detection accuracy) as the resolution of the second LCD 18, for example, is utilized. However, the resolution of the touch panel 22 and the resolution of the second LCD 18 are not necessarily coincident with each other.

Additionally, at the right side surface of the lower housing 14, a loading slot (represented by a dashed line shown in FIG. 1) is provided. The loading slot can house a touch pen 24 to be utilized for performing an operation on the touch panel 22. Generally, an input with respect to the touch panel 22 is performed with the touch pen 24, but it may be performed with a finger of the user beyond the touch pen 24. Accordingly, in a case that the touch pen 24 is not to be utilized, the loading slot and the housing portion for the touch pen 24 need not be provided.

Moreover, on the right side surface of the lower housing 14, a loading slot for housing a memory card 26 (represented by a chain double-dashed line in FIG. 1) is provided. Inside of the loading slot, a connector (not illustrated) for electrically connecting the game apparatus 10 and the memory card 26 is provided. The memory card 26 is an SD card, for example, and detachably attached to the connector. This memory card 26 is used for storing (saving) an image imaged by the game apparatus 10, and reading the image generated (imaged) or stored by another apparatus in the game apparatus 10.

In addition, on the upper side surface of the lower housing 14, a loading slot (represented by an alternate long and short dash line FIG. 1) for housing a memory card 28 is provided. Inside the loading slot as well, a connector (not illustrated) for electrically connecting the game apparatus 10 and the memory card 28 is provided. The memory card 28 is a recording medium of recording an information processing program, necessary data, etc. and is detachably attached to the loading slot provided to the lower housing 14.

At the left end of the connected portion (hinge) between the upper housing 12 and the lower housing 14, an indicator 30 is provided. The indicator 30 is made up of three LEDs 30*a*, 30*b*, 30*c*. Here, the game apparatus 10 can make a wireless communication with another appliance, and the first LED 30*a* lights up when a wireless communication with the appliance is established. The second LED 30*b* lights up while the game apparatus 10 is recharged. The third LED 30*c* lights up when the main power supply of the game apparatus 10 is turned on. Thus, by the indicator 30 (LEDs 30*a*-30*c*), it is possible to inform the user of a communication-established state, a charge state, and a main power supply on/off state of the game apparatus 10.

As described above, the upper housing 12 is provided with the first LCD 16. In this embodiment, the touch panel 22 is set so as to cover the second LCD 18, but the touch panel 22 may be set so as to cover the first LCD 16. Alternatively, two touch panels 22 may be set so as to cover the first LCD 16 and the second LCD 18. For example, on the second LCD 18, an operation explanatory screen for teaching the user how the respective operation buttons 20*a*-20*k* and the touch panel 22 work or how to operate them, and a game screen are displayed.

Additionally, the upper housing 12 is provided with the two cameras (inward camera 32 and outward camera 34). As shown in FIG. 1, the inward camera 32 is attached in the vicinity of the connected portion between the upper housing 12 and the lower housing 14 and on the surface to which the first LCD 16 is provided such that the display surface of the first LCD 16 and the imaging surface are in parallel with each other or are leveled off. On the other hand, the outward camera 34 is attached to the surface being opposed to the surface to which the inward camera 32 is provided as shown in FIG. 2 (A), that is, on the outer surface of the upper housing 12 (the surface turns to the outside when the game apparatus 10 is in a close state, and on the back surface of the upper housing 12 shown in FIG. 1). Here, in FIG. 1, the outward camera 34 is shown by a dashed line.

Accordingly, the inward camera 32 can image a direction to which the inner surface of the upper housing 12 is turned, and the outward camera 34 can image a direction opposite to the imaging direction of the inward camera 32, that is, can image a direction to which the outer surface of the upper housing 12 is turned. Thus, in this embodiment, the two cameras 32, 34 are provided such that the imaging directions of the inward camera 32 and the outward camera 34 are opposite with each other. For example, the user holding the game apparatus 10 can image a landscape (including the user, for example) as the user is seen from the game apparatus 10 with the inward camera 32, and can image a landscape as the direction opposite to the user is seen from the game apparatus 10 with the outward camera 34 and other users.

Additionally, on the internal surface near the aforementioned connected portion, a microphone 84 (see FIG. 3) is housed as a voice input device. Then, on the internal surface near the aforementioned connected portion, a through hole 36 for the microphone 84 is formed so as to detect a sound outside the game apparatus 10. The position for housing the microphone 84 and the position of the through hole 36 for the microphone 84 are not necessarily on the aforementioned connected portion, and the microphone 84 may be housed in the lower housing 14, and the through hole 36 for the microphone 84 may be provided to the lower housing 14 in correspondence with the housing position of the microphone 84.

Furthermore, on the outer surface of the upper housing 12, in the vicinity of the outward camera 34, a fourth LED 38 (dashed line in FIG. 1) is attached. The fourth LED 38 lights up at a time when an imaging is made with the inward camera 32 or the outward camera 34 (shutter button is pushed). Furthermore, in a case that a motion image is imaged with the inward camera 32 or the outward camera 34, the fourth LED 38 continues to light up during the imaging. That is, by making the fourth LED 38 light up, it is possible to inform an object to be imaged or his or her surrounding that an imaging with the game apparatus 10 is made (is being made).

Moreover, the upper housing 12 is formed with a sound release hole 40 on both sides of the first LCD 16. The above-described speaker is housed at a position corresponding to the sound release hole 40 inside the upper housing 12. The sound release hole 40 is a through hole for releasing the sound from the speaker to the outside of the game apparatus 10.

As described above, the upper housing 12 is provided with the inward camera 32 and the outward camera 34 which are constituted to image an image, and the first LCD 16 as a displayer for mainly displaying the imaged image and a game screen. On the other hand, the lower housing 14 is provided with the input device (operation button 20 (20*a*-20*k*) and the touch panel 22) for performing an operation input to the game apparatus 10 and the second LCD 18 as a displayer for mainly displaying an operation explanatory screen and a game screen. Accordingly, the game apparatus 10 has two screens (16, 18) and two kinds of operating portions (20, 22).

Figure 3:
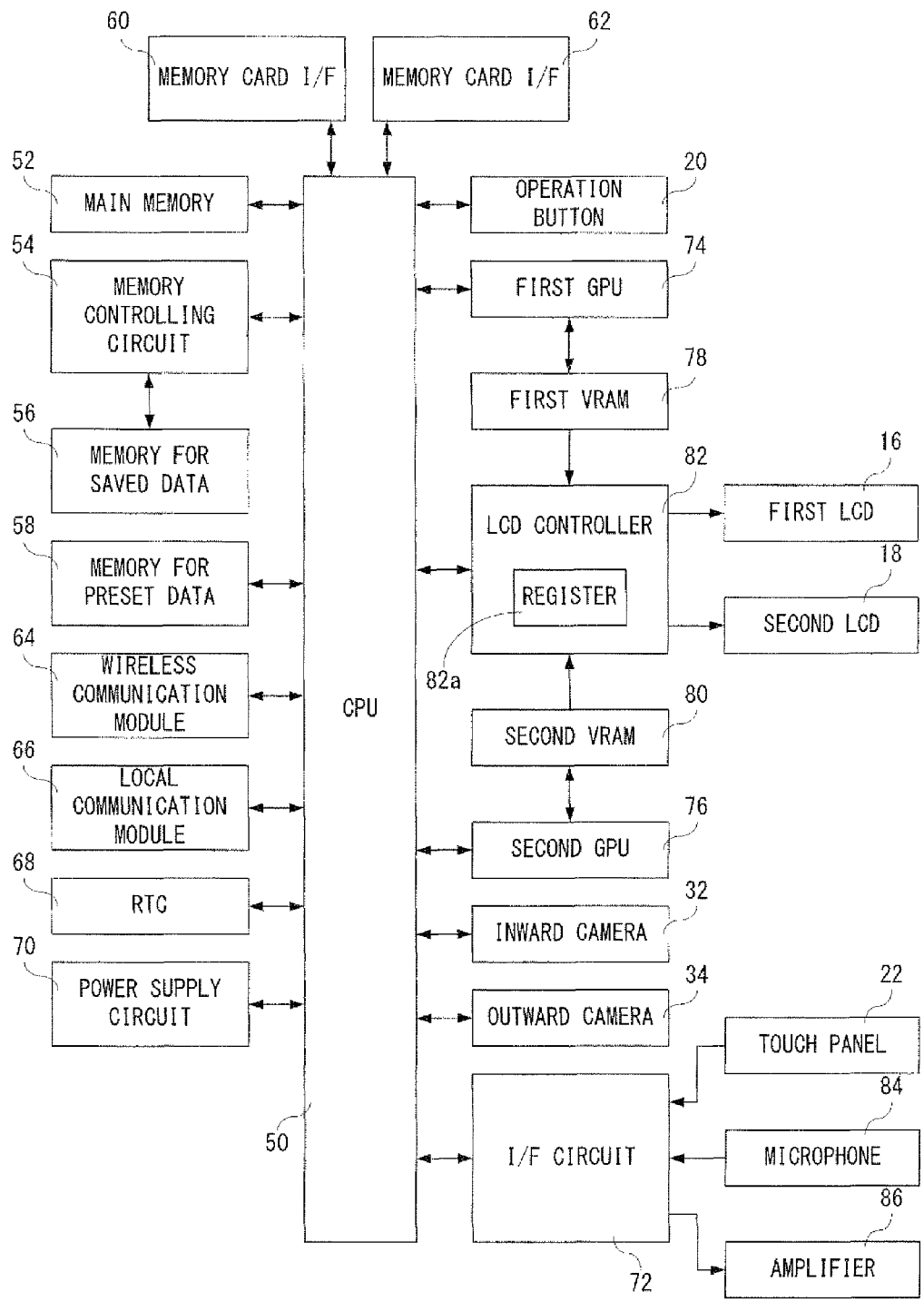
FIG. 3 is a block diagram showing an electric configuration of the game apparatus shown in FIG. 1.

FIG. 3 is a block diagram showing an electric configuration of the game apparatus 10 of this embodiment. As shown in FIG. 3, the game apparatus 10 includes electronic components, such as a CPU 50, a main memory 52, a memory controlling circuit 54, a memory for saved data 56, a memory for preset data 58, a memory card interface (memory card I/F) 60, a memory card I/F 62, a wireless communication module 64, a local communication module 66, a real-time clock (RTC) 68, a power supply circuit 70, an interface circuit (I/F circuit) 72, a first GPU (Graphics Processing Unit) 74, a second GPU 76, a first VRAM (Video RAM) 78, a second VRAM 80, an LCD controller 82, etc. These electronic components (circuit components) are mounted on an electronic circuit board, and housed in the lower housing 14 (or the upper housing 12 may also be appropriate).

The CPU 50 is an information processing means for executing a predetermined program. In this embodiment, the predetermined program is stored in a memory (memory for saved data 56, for example) within the game apparatus 10 and the memory card 26 and/or 28, and the CPU 50 executes information processing described later by executing the predetermined program.

Here, the program to be executed by the CPU 50 may be previously stored in the memory within the game apparatus 10, acquired from the memory card 26 and/or 28, and acquired from another appliance by communicating with this another appliance.

The CPU 50 is connected with the main memory 52, the memory controlling circuit 54, and the memory for preset data 58. The memory controlling circuit 54 is connected with the memory for saved data 56. The main memory 52 is a memory means to be utilized as a work area and a buffer area of the CPU 50. That is, the main memory 52 stores (temporarily stores) various data to be utilized in the aforementioned information processing, and stores a program from the outside (memory cards 26 and 28, and another appliance). In this embodiment, as a main memory 52, a PSRAM (Pseudo-SRAM) is used, for example. The memory for saved data 56 is a memory means for storing (saving) a program to be executed by the CPU 50, data of an image imaged by the inward camera 32 and the outward camera 34, etc. The memory for saved data 56 is constructed by a nonvolatile storage medium, and can utilize a NAND type flash memory, for example. The memory controlling circuit 54 controls reading and writing from and to the memory for saved data 56 according to an instruction from the CPU 50. The memory for preset data 58 is a memory means for storing data (preset data), such as various parameters, etc. which are previously set in the game apparatus 10. As a memory for preset data 58, a flash memory to be connected to the CPU 50 through an SPI (Serial Peripheral Interface) bus can be used.

Both of the memory card I/Fs 60 and 62 are connected to the CPU 50. The memory card I/F 60 performs reading and writing data from and to the memory card 26 attached to the connector according to an instruction form the CPU 50. Furthermore, the memory card I/F 62 performs reading and writing data from and to the memory card 28 attached to the connector according to an instruction form the CPU 50. In this embodiment, image data corresponding to the image imaged by the inward camera 32 and the outward camera 34 and image data received by other devices are written to the memory card 26, and the image data stored in the memory card 26 is read from the memory card 26 and stored in the memory for saved data 56, and sent to other devices. Furthermore, the various programs stored in the memory card 28 are read by the CPU 50 so as to be executed.

Here, the information processing program such as a game program is not only supplied to the game apparatus 10 through the external storage medium, such as a memory card 28, etc. but also is supplied to the game apparatus 10 through a wired or a wireless communication line. In addition, the information processing program may be recorded in advance in a nonvolatile storage device inside the game apparatus 10. Additionally, as an information storage medium for storing the information processing program, an optical disk storage medium, such as a CD-ROM, a DVD or the like may be appropriate beyond the aforementioned nonvolatile storage device.

The wireless communication module 64 has a function of connecting to a wireless LAN according to an IEEE802.1.1.b/g standard-based system, for example. The local communication module 66 has a function of performing a wireless communication with the same types of the game apparatuses by a predetermined communication system. The wireless communication module 64 and the local communication module 66 are connected to the CPU 50. The CPU 50 can receive and send data over the Internet with other appliances by means of the wireless communication module 64, and can receive and send data with the same types of other game apparatuses by means of the local communication module 66.

Furthermore, the CPU 50 is connected with an RTC 68 and a power supply circuit 70. The RTC 68 counts a time and outputs the same to the CPU 50. For example, the CPU 50 can calculate a date and a current time, etc. on the basis of the time counted by the RTC 68. The power supply circuit 70 controls electric power supplied from a power source (typically battery housed in the lower housing 14) of the game apparatus 10, and supplies the electric power to respective components of the game apparatus 10.

Also, the game apparatus 10 includes the microphone 84 and an amplifier 86. Both of the microphone 84 and the amplifier 86 are connected to the I/F circuit 72. The microphone 84 detects a voice and a sound (clap and handclap, etc.) of the user produced or generated toward the game apparatus 10, and outputs a sound signal indicating the voice or the sound to the I/F circuit 72. The amplifier 86 amplifies the sound signal applied from the I/F circuit 72, and applies the amplified signal to the speaker (not illustrated). The I/F circuit 72 is connected to the CPU 50.

The touch panel 22 is connected to the I/F circuit 72. The I/F circuit 72 includes a sound controlling circuit for controlling the microphone 84 and the amplifier 86 (speaker), and a touch panel controlling circuit for controlling the touch panel 22. The sound controlling circuit performs an A/D conversion and a D/A conversion on a sound signal, or converts a sound signal into sound data in a predetermined format. The touch panel controlling circuit generates touch position data in a predetermined format on the basis of a signal from the touch panel 22 and outputs the same to the CPU 50. For example, the touch position data is data indicating coordinates of a position where an input is performed (touched position) on an input surface of the touch panel 22.

Additionally, the touch panel controlling circuit performs reading of a signal from the touch panel 22 and generation of the touch position data per each predetermined time. By fetching the touch position data via the I/F circuit 72, the CPU 50 can know the position on the touch panel 22 where an input is made.

The operation button 20 is made up of the aforementioned respective operation buttons 20a-20k, and is connected to the CPU 50. The operation data indicating an input state (whether or not to be pushed) with respect to each of the operation buttons 20a-20k is output from the operation button 20 to the CPU 50. The CPU 50 acquires the operation data from the operation button 20, and executes processing according to the acquired operation data.

Both of the inward camera 32 and the outward camera 34 are connected to the CPU 50. The inward camera 32 and the outward camera 34 image images according to instructions from the CPU 50, and output image data corresponding to the imaged images to the CPU 50. In this embodiment, the CPU 50 issues an imaging instruction to any one of the inward camera 32 and the outward camera 34 while the camera (32, 34) which has received the imaging instruction images an image and transmits the image data to the CPU 50.

The first GPU 74 is connected with the first VRAM 78, and the second GPU 76 is connected with the second VRAM 80. The first GPU 74 generates a first display image on the basis of data for generating the display image stored in the main memory 52 according to an instruction from the CPU 50, and draws the same in the first VRAM 78. The second GPU 76 similarly generates a second display image according to an instruction form the CPU 50, and draws the same in the second VRAM 80. The first VRAM 78 and the second VRAM 80 are connected to the LCD controller 82.

The LCD controller 82 includes a register 82a. The register 82a stores a value of "0" or "1" according to an instruction from the CPU 50. In a case that the value of the register 82a is "0", the LCD controller 82 outputs the first display image drawn in the first VRAM 78 to the second LCD 18, and outputs the second display image drawn in the second VRAM 80 to the first LCD 16. Furthermore, in a case that the value of the register 82a is "1", the LCD controller 82 outputs the first display image drawn in the first VRAM 78 to the first LCD 16, and outputs the second display image drawn in the second VRAM 80 to the second LCD 18.

In this embodiment, the game apparatus 10 executes a shooting game. For example, the shooting game is a game in which a player character moves and performs a shooting action according to an operation by the player, and shoots and defeats an enemy character. In this shooting game, a plurality of stages are prepared, and when the player clears one stage, he or she proceeds to a next stage. In each stage, a start point and a goal point (or a condition for clear, such as defeating a boss character, for example) within a game field provided to the virtual space are set. Then, if the player can move the player character from the start point to the goal point (or can achieve the condition for clear, such as defeating the boss character) by performing a character moving operation, the stage is cleared.

Figure 4:
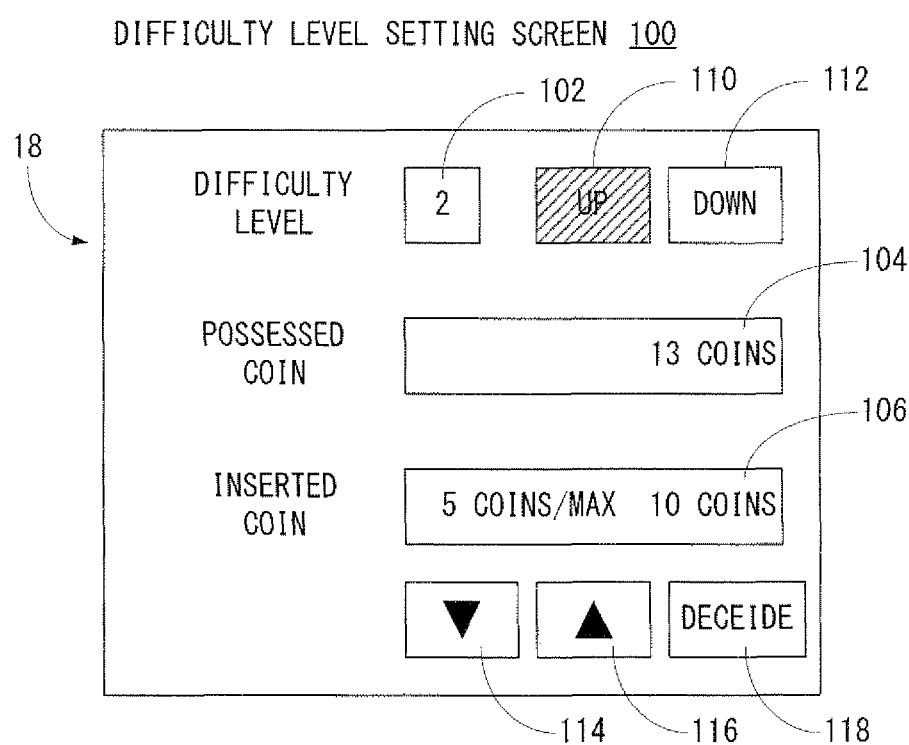
FIG. 4 is an illustrative view showing an example of a difficulty level setting screen to be displayed on an LCD of the game apparatus shown in FIG. 1.

FIG. 4 shows a difficulty level setting screen 100 to be displayed on the second LCD 18 (first LCD 16 may be possible) before the program of the shooting game of this embodiment is activated and the game play is started, that is, before the main part of the game is started. More specifically, after a stage which is to be currently played is chosen (by the user or automatically) out of the plurality of stages, the difficulty level setting screen 100 is displayed.

Here, before the stage which is to be currently played is chosen, the difficulty level setting screen 100 is displayed to perform difficulty level setting processing thereon, and then, the stage may be chosen. Before playing a next stage is started as well after a certain stage is cleared, the difficulty level setting screen 100 is displayed.

Returning to FIG. 4, on the difficulty level setting screen 100, a display field 102, a display field 104 and a display field 106 are provided.

The display field 102 displays a numerical value indicating a difficulty level. In this embodiment, the difficulty level is set by an integer from 0 to 9, and the initial value is set to 2. Furthermore, the difficulty level is made high as the numerical value is great.

The display field 104 displays the number of coins (possessed coins) which the player character 202 (see FIG. 5 described later) obtains and possesses through playing the shooting game in the past. Here, when the number of coins to be inserted described later is input by the player, the possessed coins are subtracted by the input number and displayed.

The display field 106 displays the number of coins to be inserted (inserted coins) for increasing or decreasing the difficulty level and an upper limit to the number of inserted coins. The number of coins necessary to increase and decrease the difficulty level is decided in advance (see FIG. 7), and the number of inserted coins being equal to or more than the number of coins corresponding to the difficulty level to which the player desires to set is required to be set. Here, the number of coins necessary for largely increasing the difficulty level is more. Naturally, the number of inserted coins can be set within a range of the number of possessed coins. Here, in this embodiment, the upper limit (MAX) of the number of insertable coins is further set, and the player can input the number of coins to be inserted within the range of the upper limit. For example, the upper limit is set depending on the level of the player character 202. As the level of the player character 202 becomes high, the upper limit is great. That is, as the level of the player character 202 becomes high, the upper limit of the number of insertable coins is high, so that more coins can be inserted.

Furthermore, as shown in FIG. 4, button images 110, 112, 114, 116, 118 are displayed on the difficulty level setting screen 100. The button image 110 or the button image 112 is used for choosing whether the difficulty level is increased or decreased. In the situation shown in FIG. 4, increasing the difficulty level is chosen, and the button image 110 is highlighted. When the button image 112 is touched on in this situation, the highlight of the button image 110 is turned off, and the button image 112 is highlighted to choose the decrease of the difficulty level. When the button image 110 is touched on in this situation, the highlight of the button image 112 is turned off, and the button image 110 is highlighted to thereby choose the increase of the difficulty level. The player can freely choose whether the difficulty level is increased or decreased by the button images 110 and 112.

The button image 114 is used for decreasing the number of coins to be inserted. When the button image 114 is touched on once, the number of coins to be inserted is decreased by one. Here, in a case that the button image 114 is pushed and held, the number of coins to be inserted is continuously decreased. The button image 116 is used for increasing the number of coins to be inserted. When the button image 116 is touched on once, the number of coins to be inserted is increased by one. Here, in a case that the button image 116 is pushed and held, the number of coins to be inserted is continuously increased.

It should be noted that in order to increase and decrease the difficulty level, the number of inserted coins is required to be input as described above. Furthermore, the number of inserted coins can be input within the number of possessed coins and within the range of the aforementioned upper limit.

As described above, the player freely increase and decrease the number of inserted coins (within the range of the upper limit) by touching the button images 114 and 116, and in accordance with the increase and decrease, the numerical value indicating the difficulty level of the display field 102 changes. As described later by using FIG. 7, the relationship between the number of inserted coins and the difficulty level is defined as a relationship set in advance, and therefore, the numerical value indicating the difficulty level is changed according to the current number of inserted coins based on this definition. As described above, the player can freely choose whether the difficulty level is increased or decreased, but depending on the setting, the numerical value indicating the difficulty level is changed.

Returning to FIG. 4, the button image 118 is used for deciding the number of coins to be inserted, deciding the difficulty level depending on the number, and starting to play the game in the current stage at the decided difficulty level. At this time, the number of inserted coins is subtracted from the possessed coins. Here, in a case that the button image 118 is turned on without inserting no coin (or the number of coins fewer than the number of coins required to increase or decrease the difficulty level), the game playing is started in the current stage at the standard difficulty level (difficulty level 2 being the initial value). In such a case, the inserted coin is not required, and thus, the possessed coins are not subtracted.

Additionally, although a detailed description is omitted, the touch panel 22 is provided on the second. LCD 18, and therefore, the button images 110-116 can directly be touched on by using the touch pen 24. Also, they can be touched on by using the operation button 20 (the cross key 20a and the A button 20d, for example).

(1) Game Elements to be Arranged in a Stage

Although a detailed description is omitted, when game playing of each stage is started, game elements which will appear in a stage to be played from this time are set in correspondence with the difficulty level. The game elements, here, are parameters (an attribute and a probability of appearance, etc, of the characters and items) in relation to characters (player character and enemy character, etc.) and items appearing in the virtual game. Some game elements appear in each stage irrespective of the difficulty level, but other game elements appear or do not appear depending on the difficulty level. Especially, in a case that the difficulty level is high, game elements which do not appear when the difficulty level is low appear. Or, in a case that the difficulty level is high, game elements which have a low probability of appearance when the difficulty level is low have a high probability of appearance.

For example, each of items which is decided to appear in the stage is arranged in any place within the stage (preset place or randomly-decided place), and when the player character reaches the place, it can possess the item, but the player character may possess it at the start of the stage. The game elements appearing (or having a high probability of appearing) when the difficulty level is high may preferably have a special parameter (high parameter), and they may be items or characters having a high (large) ability parameter value, for example. For example, in a case of an arm item, the parameter of an attack power is made large, and in a case of a defensive item, the parameter of a defense power is made large.

Here, even if a special parameter is not had, by changing the probability of appearance of the items merely depending on the difficulty level, the player possesses an item, etc. which another player does not possess to thereby gain a satisfaction. More specifically, a frequency of appearance (probability of appearance) of a rare treasure chest and a frequency (probability) of appearance of a rare item are changed depending on the difficulty level. The frequency of appearance (probability of appearance) of the rare treasure chest is a frequency (probability) of making the treasure chest which has a probability of containing a rare item (an item having a low probability of appearance, normally) appear in the game field. The higher the difficulty level is, the higher the frequency of appearance becomes. The frequency (probability) of appearance of a rare item is a frequency (probability) of making a rare item appear from the rare treasure chest. The higher the difficulty level is, the higher the frequency of appearance of a rare item becomes.

For example, in the ROM (not illustrated) of the memory card 26, item data as to a multiplicity of items are stored, and the item data (item data to be loaded into the main memory 52) to be used is different depending on the difficulty level. Furthermore, when game playing of each stage is started, processing of randomly deciding which item data (rare treasure chest data in this embodiment) is to be arranged in the game field (virtual space) is executed, and therefore, as the difficulty level is high, the frequency of appearance (probability) of the rare treasure chest can be raised. In addition, in this embodiment, as the difficulty level is high, the frequency (probability) of appearance of the rare item from the rare treasure chest is raised. Accordingly, when the difficulty level becomes high, a possibility of obtaining the rare item by the player (player character) also becomes high.

(2) Parameters of Game Elements Appearing in the Stage

As described above, depending on the difficulty level, the game elements appearing in the stage are changed, and separately, parameters of the game elements appearing in the game are also changed depending on the difficulty level. More specifically, an attack power of the enemy character, a defense power of the enemy character, aggressiveness of the enemy character, an attacking frequency of the enemy character, an enemy character's attack predicting time, an evading frequency of the enemy character, a shooting range of the enemy character, a velocity of a bullet shot by the enemy character, an inductive power of the bullet shot by the enemy character, the number of enemy characters, etc. are relevant. Changes in these parameters implement a change of the difficulty level.

Here, depending on the difficulty level, parameters (attack power, defense power, etc.) of the player character and the game elements to be used by the player character may be changed. More specifically, as the difficulty level becomes high, the attack power parameter may be decreased.

The attack power of the enemy character is set for performing a subtraction on a physical strength or a life of the player character when the enemy character attacks the player character. For example, the attack power of the enemy character has a preset maximum value and a preset minimum value, and takes a value between the maximum value and the minimum value depending on the difficulty level. For example, assuming that the maximum value of the attack power of the enemy character is 120, and the minimum value thereof is 30, in a case that the difficulty level is 0, the attack power of the enemy character is set to 30, and in a case that the difficulty level is 9, the attack power of the enemy character is set to 120. As to the difficulty levels 1 to 8, each attack powers is set so as to interpolate the attack power (minimum value) in a case that the difficulty level is 0 and the attack power (maximum value) in a case that the difficulty level is 9. For example, in a case that the difficulty level is 1, the attack power is set to 40, and every time that the difficulty level is increased by one, the attack power is added by 10. Hereafter, as to other game elements, the value depending on the difficulty level is similarly set.

The defense power of the enemy character is a power for defending against the attack by the player character, and is specifically a value for decreasing the value of the attack power of the player character. The defense power of the enemy character is set to a large value as the difficulty level becomes high. The aggressiveness of the enemy character is aggressiveness of attacking the player character in the battle scene. For example, in a case that the difficulty level is low, the enemy character does not attack the player character at all or scarcely attack it. Furthermore, as the difficulty level becomes high, the enemy character is increased in aggressiveness of attacking the player character.

The attacking frequency of the enemy character is a frequency of attacking the player character in the battle scene. For example, the attacking frequency is a time interval of shooting, that is, the number of attacks during a certain period of time or out of the fixed number of times. The attacking frequency is high as the difficulty level becomes high. The enemy character's attack predicting time is a time from when the enemy character is in a position to attack the player character to a time when it actually makes an attack. This attack predicting time is short as the difficulty level becomes high. The evading frequency of the enemy character is a frequency of evading the attack from the player character. For example, the evading frequency is the number of evasions or a probability of the evasion against the number of attacks. This evading frequency is high as the difficulty level becomes high.

The shooting range of the enemy character is a range or a distance where an attack by the enemy character reaches. The shooting range of the attack becomes wide and the distance thereof becomes long as the difficulty level becomes high. The velocity of the bullet shot by the enemy character is a moving velocity of a bullet shot by the enemy character. This velocity is fast as the difficulty level becomes high. The inductive power of the bullet shot by the enemy character is a power of the bullet shot by the enemy character is directed to the player character, for example, the attractive force of the player character. The inductive power (attractive force) becomes large as the difficulty level is high. The number of enemy characters is the maximum number of enemy characters appearing in the game field. This number of enemy characters is large as the difficulty level becomes high.

(3) Obtained Coin Count and Obtained Experience Point

Furthermore, depending on the difficulty level, the number of obtained coins and the obtained experience point are also changed. The number of obtained coins is the number of coins obtainable in a case that the player character (player) defeats the enemy character. This number of obtained coins is large as the difficulty level becomes high. Accordingly, even as to the same kind of enemies, as the difficulty level is high, the number of obtainable coins is large. The obtained experience point is an experience point obtainable in a case that the player character defeats the enemy character. When a predetermined number of experience points or more are accumulated, the parameter of the ability value of the player character is raised. This experience point becomes large as the difficulty level becomes high. Accordingly, even as to the same kind of enemies, as difficulty level is high, the obtainable experience point is large. That is, as the difficulty level becomes high, the number of obtained coins and the obtained experience point are large. This gives advanced players a motivation to increase the difficulty level in order to obtain more coins and experience points.

It should be noted that the aforementioned articles from (1) to (3) are similarly changed as the game proceeds as well as when the difficulty level is set (changed) by the player. That is, as the game proceeds (in the latter stage), the frequency of appearance (probability of appearance) of the rare treasure chest and the frequency (probability) of appearance of the rare item become high, the parameters, such as the attack of the enemy character, etc. raises, and the number of obtained coins and the obtained experience point become high. For example, in a case that the player sets the difficulty level to 9 in the middle of the stage, this corresponds to the game playing at the standard difficulty level in the final stage.

Figure 5:
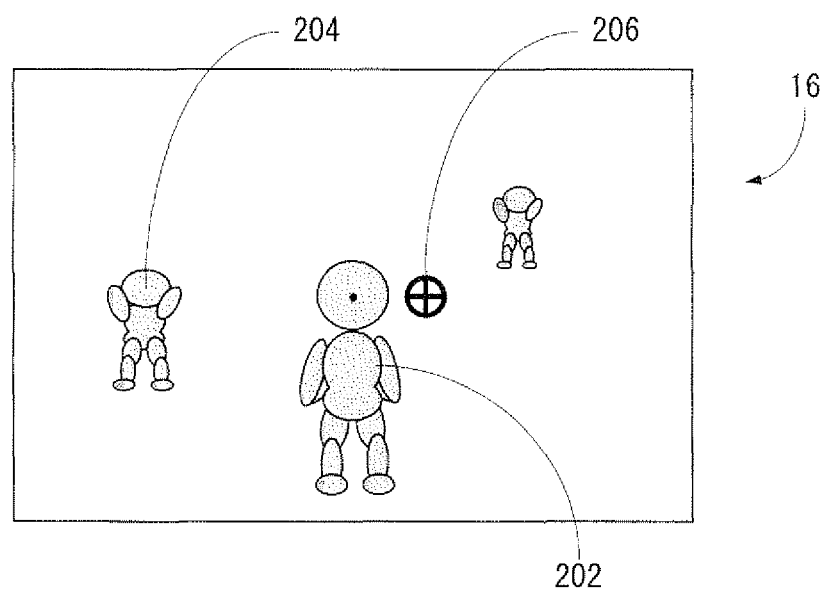
FIG. 5 is an illustrative view showing an example of a game screen to be displayed on an LCD of the game apparatus shown in FIG. 1.

When game playing in each stage is started, a game screen 200 as shown in FIG. 5 is displayed on the first LCD 16. On the game screen 200, a player character 202 is displayed, and one or a plurality of enemy characters 204 are displayed on the game field (game map). Here, the enemy character 204 may not be always necessary to be displayed, and may be displayed (appear) according to a predetermined game event such as an approach of the player character 202, etc.

Additionally, on the game screen 200, background objects, such as trees, buildings, floors, ground, etc. are also displayed.

Furthermore, as described above, when game playing is started in each stage, the difficulty level is set, so that the game data to be used is decided depending on the set difficulty level, and the treasure chests described later are arranged in the game field based on the frequency of appearance according to the difficulty level.

As described above, the shooting game of this embodiment is a game in which the player character 202 moves and performs a shooting action, and shots and defeats the enemy character 204, according to an operation by the player. When the player character 202 succeeds in attacking the enemy character 204, that is, it defeats the enemy character 204, a predetermined number of coins are obtained. The obtained coins are possessed by the player character 202. Furthermore, at this time, the player character 202 obtains the experience point of a predetermined value. The player character 202 buys items and arms, stays, and has a meal by using the possessing coin (possessed coin). When the player character 202 buys the items and arms, stays and has a meal, the possessed coins are subtracted by a necessary count.

Accordingly, the player character 202 is increased in the attack power by equipping high-performance arms, for example. Furthermore, the player character 202 recovers the physical strength or the life through the meals and stays. Here, the item is sometimes in the treasure chest obtainable in the game field, and is not necessarily bought. Furthermore, the item is classified into a normal item (non-rare item) and a rare item, and the non-rare item is generally in a treasure chest, and the rare item is in a rare treasure chest.

Furthermore, the player character 202 is increased in the ability value as the experience point is increased. The ability value is set in steps depending on the level of the player character 202. The level is raised when the accumulated experience point becomes a predetermined value. Here, to each level, the maximum value as to the experience point is set in advance. For example, the player character 202 obtains the experience point by defeating the enemy character 204. The obtained experience point is accumulated, and when the accumulated experience point is equal to or more than the maximum value of the experience point at the current level, the level of the player character 202 is raised by one. This raises the ability value of the player character 202. For example, the ability value is a value set to each ability, such as a moving velocity, a quickness of an attack, a hit probability of an attack, a shooting range (distance) of attack, a defense power, etc.

Additionally, the player can shoot and defeat the enemy character 204 and evades an attack from the enemy character 204 by performing a moving operation of the player character 202 and a shooting action instructing operation with the use of the various buttons 20. The shooting direction is decided on the basis of the position of a gun sight 206. More specifically, the shooting direction is a direction from the position of the player character 202 to the position of the gun sight 206, and a bullet object not shown is fired to fly toward this direction. Then, when the bullet object hits the enemy character 204, the attack power of the player character 202 and the defense power of the enemy character 204 are compared, and the life of the enemy character 204 is reduced in correspondence with the comparison result. When the life becomes 0, the enemy character 204 disappears. When the life of the enemy character 204 becomes 0 to make it disappear, this is considered as a success in the game, and the coins and the experience point are obtained. Here, as a modified example, when the bullet object and the enemy character 204 hit with each other (even if the life of the enemy character 204 does not become 0), this is considered as a success in the game, and the coins and the experience point may be obtained. Additionally, the enemy character 204 also performs a shooting action on the player character 202, and when the bullet object hits the player character 202 by the shooting action, the defense power of the player character 202 and the attack power of this enemy character 204 are compared. Then, the life of the player character 202 is reduced in correspondence with the comparison result. When the life becomes 0, the game is over.

Furthermore, in this embodiment, when one player character 202 is made to disappear, the game is directly over, but when all of the plurality of player characters 202 are made to disappear, the game may be over. Alternatively, in another virtual game, when the time limit expires before the final goal or the interim goal is attained, the game may be over.

Although illustration is omitted, when the game is over, a confirmation screen for determining whether the game is started from a point where the player quits (continue) is displayed on the second LCD 18. For example, on the confirmation screen, a message asking for whether "continue" or not is displayed, and a button image designating to "continue" the game and a button image designating not to "continue" the game are displayed.

For example, when not "continue" is chosen, a main menu screen (not illustrated) for displaying a list of the applications from which the player makes a choice for activation or set options is displayed on the second LCD 18. On the other hand, when "continue" is chosen, the screen returns to the difficulty level setting screen 100 shown in FIG. 4. That is, the difficulty level setting screen 100 is displayed on the second LCD 18.

In this embodiment, in a case that the difficulty level was set to high (difficulty level is equal to or more than 3) in the stage where the game was over, the difficulty level is returned to the initial value (difficulty level 2). In such a case, the inserted coins are confiscated, resulting in a penalty for the player. Thus, it can be said that this game is a challenging virtual game. On the other hand, in a case that the difficulty level was set to low (difficulty level is 0 or 1) in the stage where the game was over, the difficulty level is retained (difficulty level is held 0 or 1).

Here, if "continue" is made, the screen returns to the difficulty level setting screen 100 as described above, and therefore, on the difficulty level setting screen 100, the player can change the difficulty level if he or she desires. After setting the difficulty level, game playing is started in the stage the same as the stage where the game was over.

Figure 6:
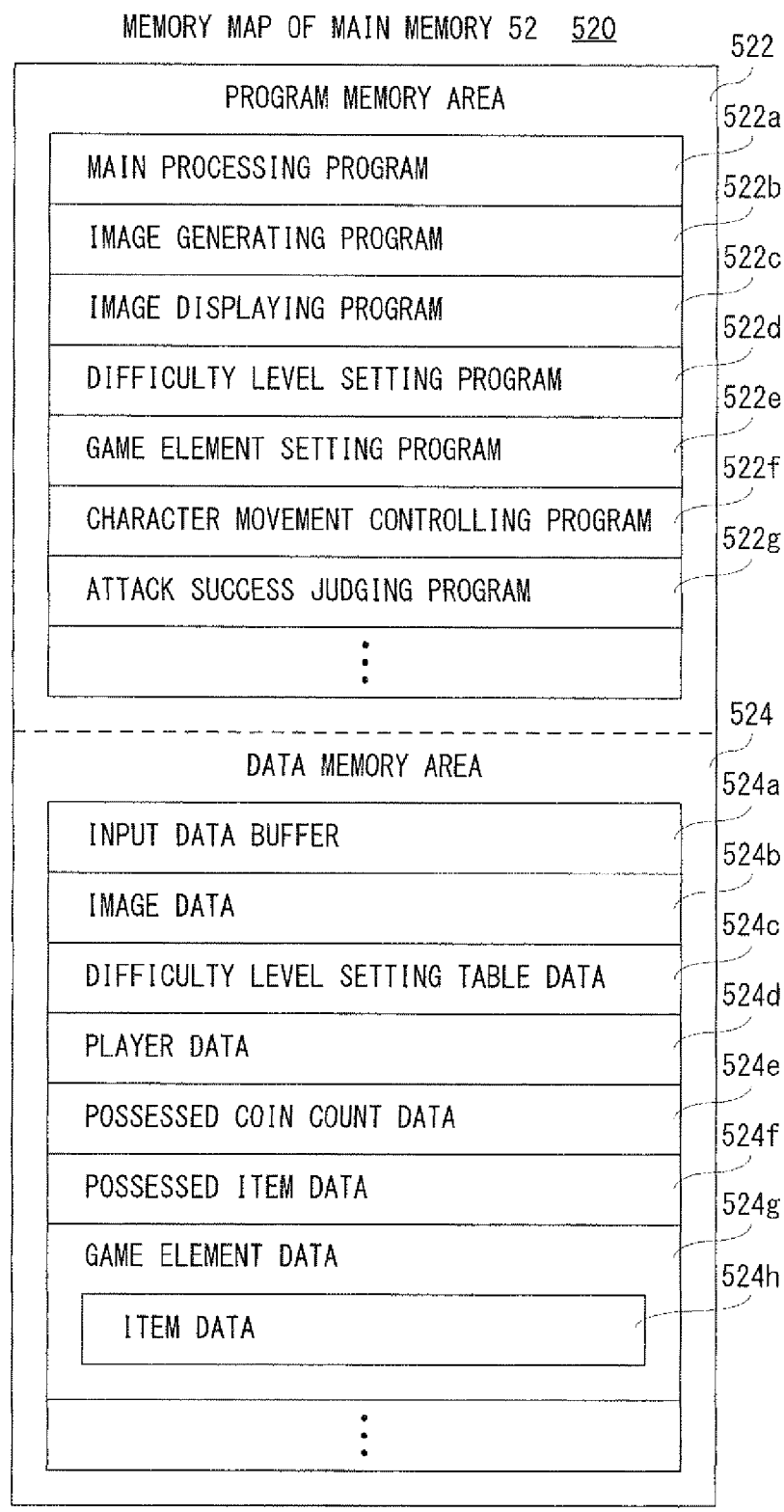
FIG. 6 is an illustrative view showing an example of a memory map of a main memory shown in FIG. 3.

FIG. 6 is an example of a memory map 520 of the main memory 52 shown in FIG. 3. As shown in FIG. 6, the main memory 52 includes a program memory area 522 and a data memory area 524. The program memory area 522 stores a game program, and the game program is made up of a main processing program 522a, an image generating program 522b, an image displaying program 522c, a difficulty level setting program 522d, a game element setting program 522e, a character movement controlling program 522f, an attack success judging program 522g, etc. These programs are stored in advance in a nonvolatile memory within the memory card 26 or the memory for saved data 56, and loaded into the main memory 52 when activation of the program is instructed.

The main processing program 522a is a program for processing a main routine of the virtual game (shooting game) of this embodiment. The image generating program 522b generates game image data for displaying a screen (100, 200, etc.) by using the image data 524b described later. At the beginning of the virtual game, the player character 202 and the enemy character 204 are arranged at initial positions, and items are also arranged at predetermined positions. The image displaying program 522c displays the game image data generated according to the image generating program 522b as a screen on the first LCD 16 or the second LCD 18, or both of them.

The difficulty level setting program 522d sets the difficulty level according to an instruction from the player prior to the start of each stage of the virtual game, and returns the difficulty level to the initial value (difficulty level 2) in a case that the difficulty level is set to high (difficulty level is equal to or more than 3) in the immediately preceding stage where the game was over when "continue" is chosen. The game element setting program 522e sets appearing game elements and the parameters, etc depending on the difficulty level set prior to the start of the virtual game by the difficulty level setting program 522d. Furthermore, the difficulty level setting program 522d sets a settable difficulty level, that is, the number of insertable coins (upper limit) in correspondence with the level of the player character 202. Although the illustration is omitted, a table in which the number of insertable coins (upper limit) is decided in correspondence with the level of the player character 202 is prepared in advance, and according thereto, the number of insertable coins is set.

The character movement controlling program 522f is a program for controlling the player character 202 and the enemy character 204. Briefly speaking, the character movement controlling program 522f moves the player character 202, and makes the player character 202 perform an arbitrary action (attack, etc.) according to an operation by the player. Furthermore, the character movement controlling program 522f makes the enemy character 204 appear, makes the enemy character 204 move, and makes the enemy character 204 perform a predetermined action (attack, evade, etc.) irrespective of an operation by the player.

The attack success judging program 522g is a program for judging whether or not the player character 202 succeeds in attacking the enemy character 204. In this embodiment, whether the player character 202 defeats the enemy character 204 is determined, and in a case that the player character 202 defeats the enemy character 204, it is judged that attacking the enemy character 204 is successful.

Although illustration is omitted, in the game program, a sound outputting program, a backup program, etc. are included. The sound outputting program is a program for outputting a sound necessary for the game, such as voices or onomatopoeic sounds of characters, a sound effect, and music (BGM) by using sound data not shown. The backup program is a program for storing (saving) game data (proceeding data, result data) in the memory cards 26, 28 and the memory for saved data 56 according to an instruction from the player and a predetermined event.

Returning to FIG. 6, in the data memory area 524, an input data buffer 524a is provided. The input data buffer 524a stores (temporarily stores) operation data input from the operation button 20 and touch position data input from the touch panel 22 in chronological order. The operation data and the touch position data are deleted from the operation data buffer 524a when they are used in the game processing.

Furthermore, in the data memory area 524, image data 524b, difficulty level setting table data 524c, player data 524d, possessed coin count data 524e, possessed item data 524f, game element data 524g, item data 524h, etc. are stored.

The image data 524b is data, such as polygon data and texture data for generating game image data. The difficulty level setting table data 524c is data for a table in which the number of coins necessary for setting the difficulty level is decided in advance. This table data is, similar to the aforementioned programs, stored in advance in the nonvolatile memory of the memory card 26 or the memory for saved data 56, and loaded into the main memory 52 when activation of the program is instructed.

FIG. 7 is an illustrative view showing an example of the difficulty level setting table according to the difficulty level setting table data 524c. As shown in FIG. 7, in the difficulty level setting table, the number of coins (inserted coins) necessary for setting the difficulty level is described in correspondence with the difficulty level. As described above, the difficulty level is set by integers of 0 to 9, and the difficulty level 2 is the initial value. As understood from FIG. 7, in a case that the difficulty level is increased and also decreased from the initial value, coins are required. Furthermore, the larger a change amount of the difficulty level is, the larger the necessary number of coins is. In this embodiment, in a case that the difficulty level is increased, the number of coins is set to be large with a rising intonation, but this may be set to be large linearly or in steps. Furthermore, in this embodiment, in a case that the difficulty level is decreased, the number of coins is linearly (in steps) large, but in a case that the difficulty level is set to 0, the number of further coins may be required.

Returning to FIG. 6, the player data 524d includes numerical value data (level data) indicating the level of the player character 202, numerical value data (experience point data) as to the experience point, and numerical value data (ability value data) as to the ability value.

The possessed coin count data 524e is numerical value data as to the number of coins possessed by the player character 202. Furthermore, the possessed item data 524f is data of the item possessed by the player character 202 (item identification number data and attribute value data).

The player data 524d, the possessed coin count data 524e and the possessed item data 524f are saved and stored in the rewritable nonvolatile memory within the memory card 26 or the memory for saved data 56 at an end of the game playing, and are loaded into the main memory 52 when an activation of the program is instructed.

The game element data 524g is data defining an image and a parameter as to each of the above-described game elements (enemy character, item, etc.). Furthermore, the stage in which each game element appears is defined. The item data 524h is a part of the game element data 524g, is image data of each item to be used in the virtual game, parameter data like an attack power, etc., data defining a stage in which each item appears and data of an arrangement position, and further sets a flag for determining whether or not the item is to be arranged (is made to appear). In addition, a flag indicating whether the rare item or not is also set. The data as to all items appearing in the virtual game are stored in advance in the nonvolatile memory within the memory card 26 or the memory for saved data 56, and when game playing in each stage is started, the item data appearing in this stage is loaded in the main memory 52.

Although illustration is omitted, in the data memory area 524, other data such as sound data, etc. is stored, and flags and counters (timers) necessary for the processing of the virtual game are set.

Figure 8:
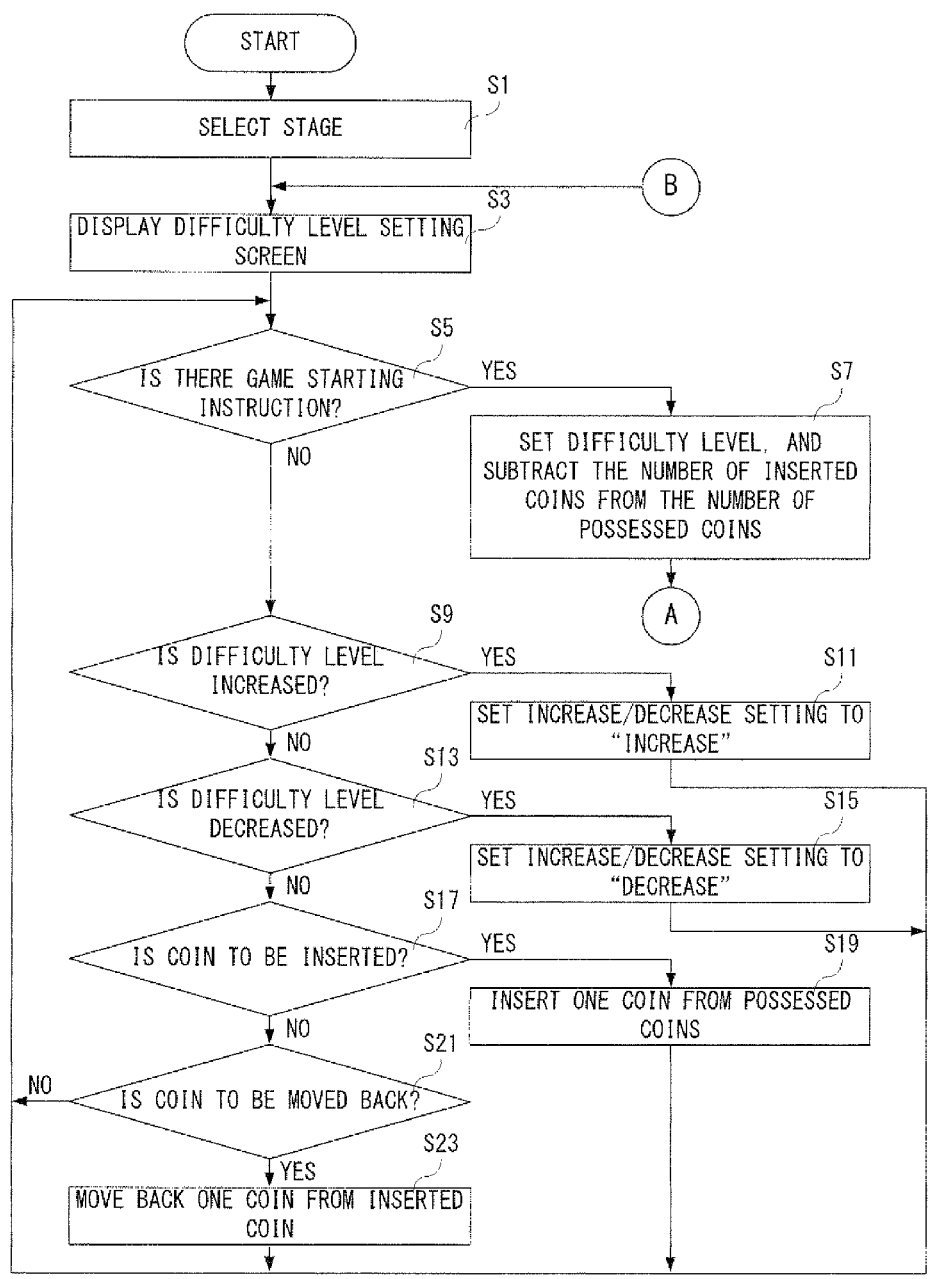
FIG. 8 is a flowchart showing a first part of game entire processing by a CPU shown in FIG. 3.

FIG. 8 to FIG. 13 are flowcharts showing game entire processing of the virtual game of this embodiment. As shown in FIG. 8, when starting game entire processing, the CPU 50 executes playing stage choosing processing in a step S1. When the game is played for the first time, a stage 1 (first stage) is automatically chosen. Here, one stage can be chosen from a plurality of stages. After clearing each stage, the player can choose the cleared stage if he or she desires.

In a succeeding step S3, the difficulty level setting screen 100 shown in FIG. 4 is displayed on the second LCD 18. Here, when the difficulty level setting screen 100 is displayed, with reference to the level data included in the player data 524d, the maximum value (MAX) of the number of insertable coins is decided in correspondence with the level of the player character 202, and with reference to the possessed coin count data 524e, a corresponding numerical value is set as the number of possessed coins. Furthermore, at the beginning of displaying the difficulty level setting screen 100, the number of inserted coins is 0.

In a next step S5, it is determined whether or not there is a game starting instruction. That is, the CPU 50 determines whether or not the button image 118 is turned on. More specifically, the CPU 50 determines whether or not the operation data or the touch position data indicates that the button image 118 is designated and turned on with reference to the operation data buffer 524a. This holds true for determination whether the button image is turned on below.

If "YES" in the step S5, that is, if there is a game starting instruction, the difficulty level is set depending on the number of inserted coins and an increase/decrease setting described later, and the number of inserted coins is subtracted from the number of possessed coins in a step S7, and the process proceeds to a step S25 in FIG. 9 described later. That is, in the step S7, the CPU 50 sets the difficulty level displayed in the display field 102, and subtracts the number of inserted coins from the number of possessed coins indicated by the possessed coin count data 524e to thereby update the possessed coin count data 524e. Here, in a case that the number of inserted coins is 0, the difficulty level is set to the initial value "2". On the other hand, if "NO" in the step S5, that is, if there is no game starting instruction, it is determined whether or not the difficulty level is increased in a step S9. That is, the CPU 50 determines whether or not the button image 110 is turned on.

If "YES" in the step S9, the increase/decrease setting is set to "increase" in a step S11, and the process returns to the step S5. The increase/decrease setting is a setting for choosing whether the difficulty level is to be increased or decreased by consuming the inserted coins. That is, with reference to FIG. 7, when the decision button 118 is touched assuming that the number of inserted coins is 10, in a case that the increase/decrease setting is "increase", the difficulty level is set to 4, and in a case that the increase/decrease setting is "decrease", the difficulty level is set to 1. On the other hand, if "NO" in the step S9, the CPU 50 determines whether or not the button image 110 is turned on in a step S13.

If "YES" in the step S13, the increase/decrease setting is set to "decrease" in a step S15, and the process returns to the step S5. On the other hand, if "NO" in the step S13, it is determined whether or not a coin is to be inserted in a step S17. That is, the CPU 50 determines whether or not the button image 114 is turned on.

If "YES" in the step S17, that is, if a coin is inserted, one coin is inserted from the possessed coins in a step S19, and the process returns to the step S5. More specifically, in the step S17, the number of possessed coins displayed in the display field 104 is subtracted by one, and the number of inserted coins displayed in the display field 106 is increased by one. Furthermore, in a case that the number of possessed coins is 0, the inserted coin cannot be increased. On the other hand, if "NO" in the step S17, that is, if a coin is not to be inserted, it is determined whether or not a coin is to be moved back in a step S21. That is, the CPU 50 determines whether or not the button image 116 is turned on.

If "NO" in the step S21, that is, if a coin is not moved back, the process returns to the step S5 as it is. On the other hand, if "YES" in the step S21, that is, if a coin is moved back, one coin is moved back from the inserted coin in a step S23, and the process returns to the step S5. More specifically, in the step S23, the number of inserted coins displayed in the display field 106 is decreased by one, and the number of possessed coins displayed in the display field 104 is increased by one. Furthermore, in a case that the number of inserted coins is 0, the inserted coin cannot be moved back.

The number of inserted coins is thus decided, and the CPU 50 increases the difficulty level when the increase/decrease setting is set to "increase", and decrease the difficulty level when the increase/decrease setting is set to "decrease", depending on the number of inserted coins when it is determined that the button 118 is operated in the aforementioned step S5.

Figure 9:
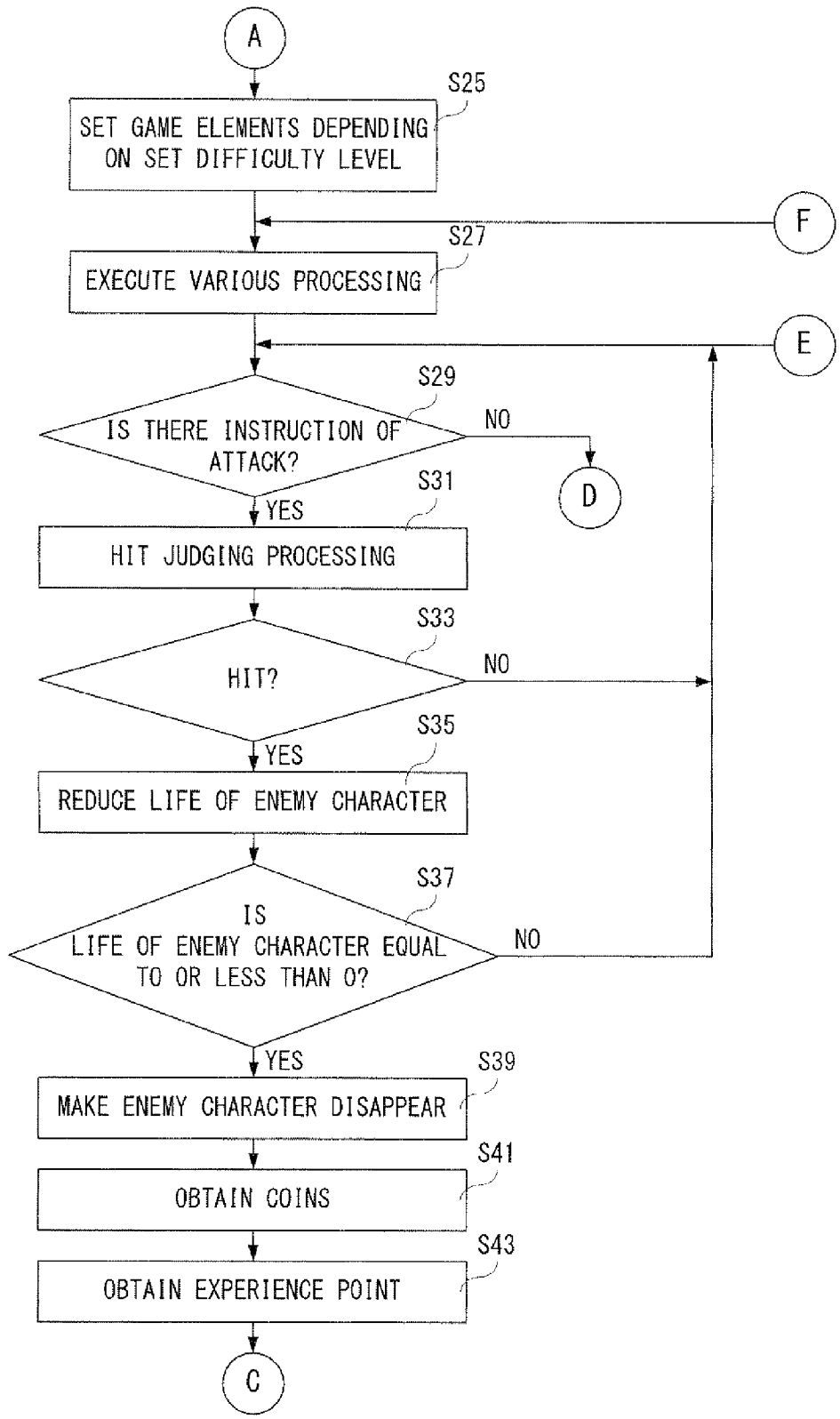
FIG. 9 is a flowchart showing a second part of the game entire processing by the CPU shown in FIG. 3 being sequel to FIG. 8.

As shown in FIG. 9, in the step S25, the game elements are set depending on the difficulty level set on the difficulty level setting screen 100. For example, the probability of appearance of the rare treasure chest is set. More specifically, when the difficulty level is higher than the initial value (is equal to or more than 3), the probability of appearance of the rare treasure chest is changed to be higher than a standard value. Then, a random value is generated, and by using the random value and the standard or the changed probability of appearance, the number of rare treasure chests is decided, and the rare treasure chests by the decided number are arranged in predetermined positions in the stage where the player will subsequently play. Furthermore, out of the items defined by the item data 524h, non-rare items which are defined to appear in the stage where the player will subsequently play are also arranged in the stage. In addition, the player character 202 and the enemy characters 204 are also arranged in initial positions. Accordingly, the game screen 200 as shown in FIG. 5 is displayed on the first LCD 16.

In a succeeding step S27, various processing is executed. More specifically, in the step S27, the CPU 50 makes the player character 202 move on the game field, buy an item and stay according to an operation by the player. Although illustration is omitted, when the possessed coins are used by buying the item and staying, the possessed coins by the used number are subtracted. Accordingly, the possessed coin count data 524e is updated. Then, the bought item is registered as a possessed item of the player character 202, and set to be useable. That is, the possessed item data 524f is updated. Furthermore, in the step S27, the CPU 50 makes the enemy character 204 appear in the game field and makes it move in the game field.

In a next step S29, it is determined whether or not there is an instruction of an attack. Although a description in detail is omitted, the CPU 50 determines whether or not the player performs an attacking operation (instruction) on the basis of the operation data and the touch position data with reference to the operation data buffer 524a. If "NO" in the step S29, that is, if there is no instruction of an attack, the process proceeds to a step S71 shown in FIG. 12. On the other hand, if "YES" in the step S29, that is, if there is an instruction of an attack, hit judging processing is executed in a step S31. That is, the CPU 50 judges whether or not the arms used by the player character 202 and the bullet fired by the player character 202 collide (hit) with the enemy character 204. The hit judging processing has already been known, and this is not the essential content of the present invention, and therefore, a description in detail is omitted. As described later, this holds true for a judgment whether the attack by the enemy character 204 hits the player character 202.

Succeedingly, in a step S33, it is determined whether or not the attack by the player character 202 hits the enemy character 204. If "NO" in the step S33, that is, if the attack by the player character 202 does not hit the enemy character 204, the process returns to the step S29 as it is. On the other hand, if "YES" in the step S33, that is, if the attack by the player character 202 hits the enemy character 204, the life HP of the enemy character 204 is reduced in a step S35. Here, the CPU 50 subtracts the value evaluated by subtracting the defense power of the enemy character 204 from the attack power of the player character 202 from the life HP of the enemy character 204. Here, in a case that the attack power of the player character 202 is below the defense power of the enemy character 204, the life HP of the enemy character 204 is not subtracted and not added. As described later, this holds true for a case that the attack by the enemy character 204 hits with the player character 202.

In a succeeding step S37, it is determined whether or not the life HP of the enemy character 204 is equal to or less than 0. If "NO" in the step S37, that is, if the life HP of the enemy character 204 is larger than 0, the process returns to the step S29. On the other hand, if "YES" in the step S37, that is, if the life HP of the enemy character 204 is equal to or less than 0, it is determined that attacking the enemy character 204 is successful, and this enemy character 204 is made to disappear in a step S39, and the coins are obtained in a step S41. Here, in the step S41, the number of coins decided depending on the kind of the enemy character 204 and the difficulty level can be obtained. More specifically, the number of coins currently obtained is accumulatively added to the number of possessed coins. That is, the possessed coin count data 524e is updated.

Figure 10:
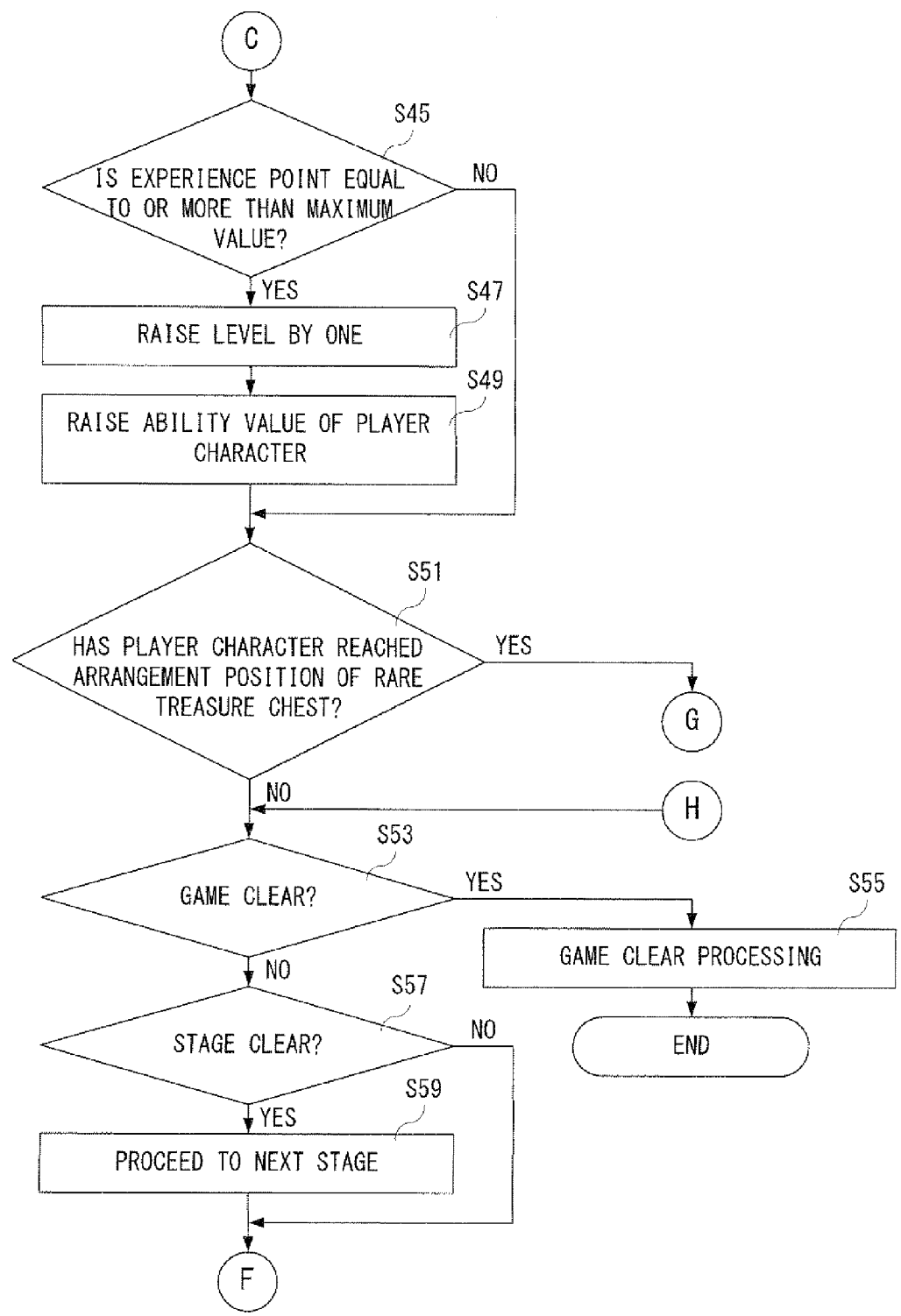
FIG. 10 is a flowchart showing a third part of the game entire processing by the CPU shown in FIG. 3 being sequel to FIG. 9.

Succeedingly, in a step S43, the experience point is obtained. This experience point is also decided depending on the kind of the enemy character 204 and the difficulty level. Accordingly, the value of the experience point currently obtained is accumulatively added to the experience point that has already been obtained. That is, the experience point data included in the player data 524d is updated. As shown in FIG. 10, in a next step S45, it is determined whether or not the experience point is equal to or more than the maximum value. Here, the maximum value of the experience point is the maximum value of the experience point at the current level of the player character 202 and is decided for each level in advance.

If "NO" in the step S45, that is, if the experience point is not equal to or more than the maximum value, the process proceeds to a step S51 as it is. On the other hand, if "YES" in the step S45, that is, if the experience point is equal to or more than the maximum value, the level is raised by one in a step S47, the ability value of the player character 202 is raised in a step S49, and the process proceeds to the step S51. That is, in the steps S47 and S49, the level data and the ability value data that are included in the player data 524d are updated.

Here, although a detail of the ability value is not described, in the step S49, each element of the ability value is increased by a predetermined step, for example.

Then, in the step S51, it is determined whether or not the player character 202 has reached the arrangement position of the rare treasure chest. More specifically, the position data (current position) of the player character 202 within the virtual space and the position data (arrangement position) of the rare treasure chest within the virtual space are compared, and it is determined whether or not they are within the predetermined distance. If "NO" in the step S51, that is, if the player character 202 has not reached the arrangement position of the rare treasure chest, the process proceeds to a step S53 as it is.

Figure 11:
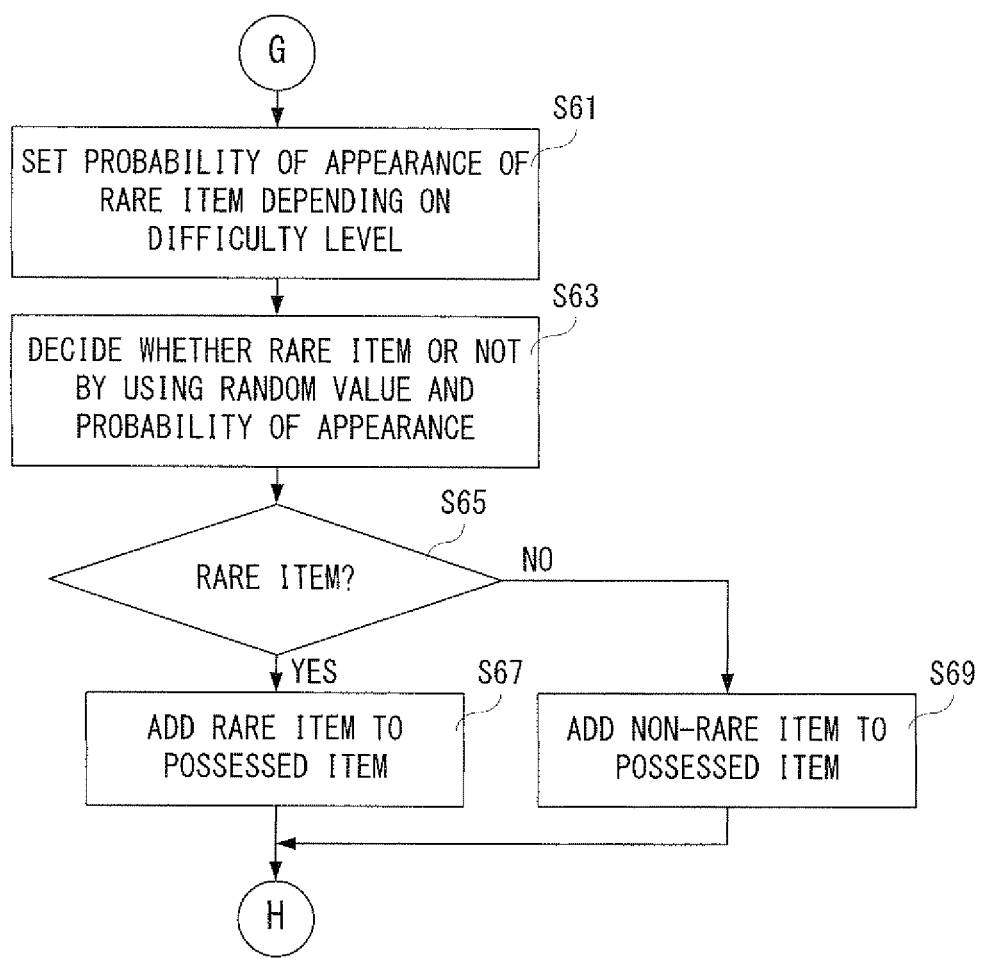
FIG. 11 is a flowchart showing a fourth part of the game entire processing by the CPU shown in FIG. 3 being sequel to FIG. 10.

On the other hand, if "YES" in the step S51, that is, if the player character 202 has reached the arrangement position of the rare treasure chest, in a step S61 shown in FIG. 11, the probability of appearance of the rare item is set depending on the difficulty level. More specifically, when the difficulty level is higher than the initial value "2", the probability of appearance of the rare item is set to be higher than the standard value. Next, in a step S63, it is determined whether or not the rare item is made to appear by using the random value and the probability of appearance set in the step S61.

Then, in a step S65, it is determined whether the rare item or not. If "YES" in the step S65, that is, if the rare item, the rare item is added to the possessed item in a step S67, and the process proceeds to the step S53 shown in FIG. 10. More specifically, in the step S67, one rare item randomly chosen among the rare items (about which the rare item flag is turned on) which are defined as appearing in the stage where the game is currently being played out of the items defined by the item data 524h is added as a possessed item. That is, the possessed item data 524f is updated.

On the other hand, if "NO" in the step S65, that is, if not the rare item, a non-rare item is added to the possessed item in a step S69, and the process proceeds to the step S53. More specifically, in the step S69, out of the items defined by the item data 524g, one non-rare item randomly chosen out of the non-rare items (about which the rare item flag is turned off) which are defined as appearing in the stage where the game is being played is added as a possessed item. That is, the possessed item data 524f is updated.

Returning to FIG. 10, in the step S53, it is determined whether game clear or not. Here, the CPU 50 determines whether or not all the stages are cleared. If "YES" in the step S53, that is, if the game clear, game clearing processing is executed in a step S55, and the game entire processing is ended. For example, in the step S55, the CPU 50 displays a message indicating that the game is cleared, a sound effect or music representing that the game is cleared are output, and the end credits are displayed.

On the other hand, if "NO" in the step S53, that is, if not the game clear, it is determined whether or not stage clear in a step S57. Here, the CPU 50 determines whether or not the goal of the stage has been attained. If "NO" in the step S57, that is, if not the stage clear, the process returns to the step S27 shown in FIG. 9. On the other hand, if "YES" in the step S57, that is, if the stage clear, the process proceeds to a next stage in a step S59, and the process returns to the step S27. At this time, by the progress of the stage, the difficulty level is changed (heightened).

Figure 12:
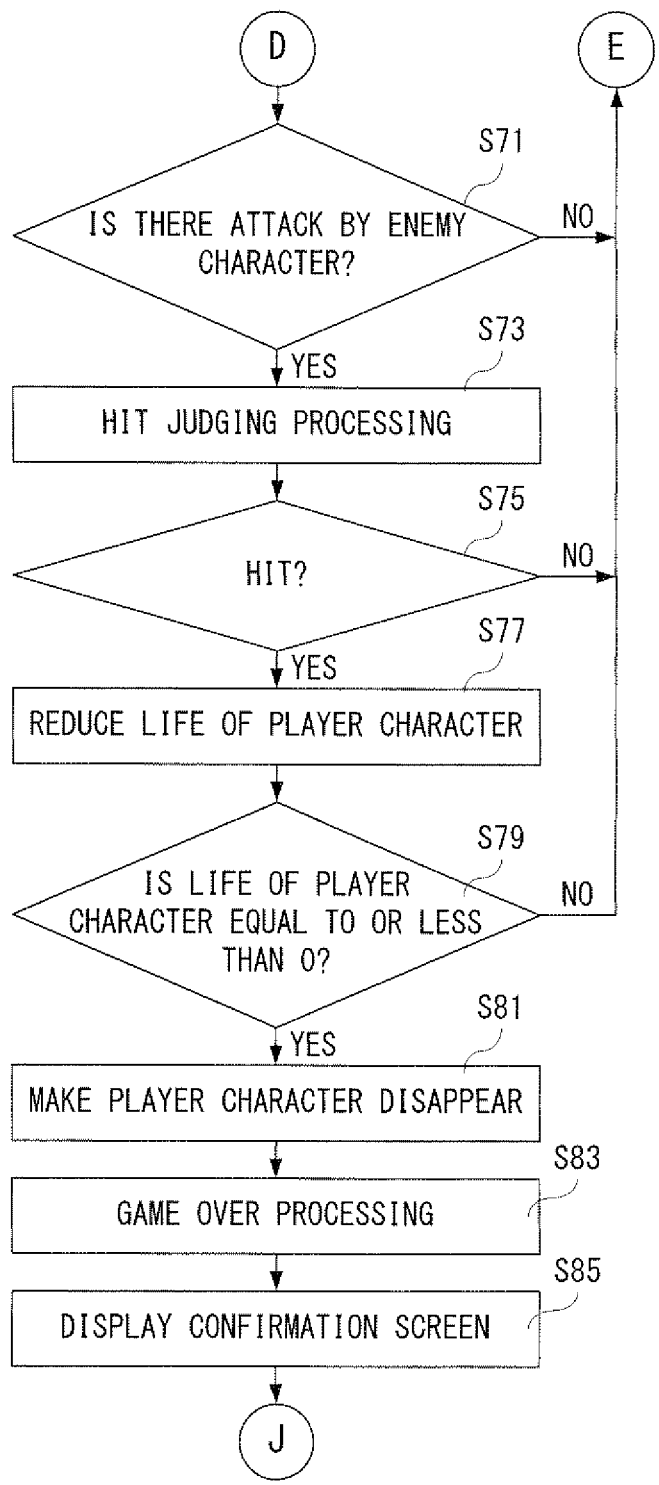
FIG. 12 is a flowchart showing a fifth part of the game entire processing by the CPU shown in FIG. 3 being sequel to FIG. 9.

As shown in FIG. 12, in the step S71, it is determined whether or not there is an attack by the enemy character 204. That is, the CPU 50 determines whether or not the enemy character 204 is made to attack the player character 202. If "NO" in the step S71, that is, if there is no attack by the enemy character 204, the process returns to the step S29 as it is. On the other hand, if "YES" in the step S71, that is, if there is an attack by the enemy character 204, hit judging processing is executed in a step S73. In a next step S75, it is determined whether or not the attack by the enemy character 204 hits the player character 202.

If "NO" in the step S75, that is, if the attack by the enemy character 204 does not hit the player character 202, the process returns to the step S29. On the other hand, if "YES" in the step S75, that is, if the attack by the enemy character 204 hits the player character 202, the life HP of the player character 202 is reduced in a step S77, and it is determined whether or not the life HP of the player character 202 is equal to or less than 0 in a step S79.

If "NO" in the step S79, that is, if the life HP of the player character 202 is larger than 0, the process returns to the step S29 as it is. On the other hand, if "YES" in the step S79, that is, if the life HP of the player character 202 is equal to or less than 0, the player character 202 is made to disappear in a step S81, and game over processing is executed in a step S83. Here, the CPU 50 displays a message indicating that the game is over, and outputs a sound effect or music representing that the game is over. Then, in a step S85, a confirmation screen for determining whether to "continue" or not is displayed on the second LCD 18.

Figure 13:
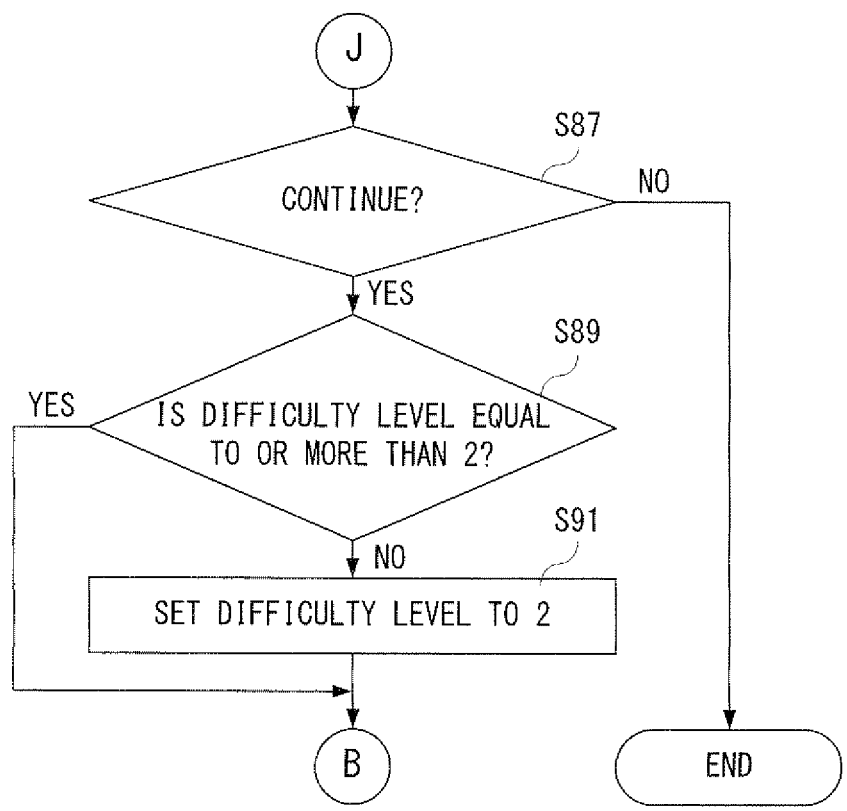
FIG. 13 is a flowchart showing a sixth part of the game entire processing by the CPU shown in FIG. 3 being sequel to FIG. 12.

Succeedingly, in a step S87 shown in FIG. 13, it is determined whether or not "continue" is chosen. If "NO" in the step S87, that is, if "continue" is not chosen, it is determined that the game is to be ended, and the game entire processing is ended. On the other hand, if "YES" in the step S87, that is, if "continue" is chosen, it is determined whether or not the difficulty level is equal to or less than 2 (initial value) in a step S89.

If "YES" in the step S89, that is, if the difficulty level is equal to or less than 2, the process returns to the step S3 shown in FIG. 8 as it is. On the other hand, if "NO" in the step S89, that is, if the difficulty level is equal to or more than 3, the difficulty level is set to 2, that is, the difficulty level is returned to the initial value in a step S91, and then, the process returns to the step S3.

According to this embodiment, by using the coins obtained by defeating the enemy character in the virtual game, the difficulty level of the virtual game is increased, and therefore, it is possible to provide a virtual game having a novel difficulty level setting (changing) function.

Furthermore, according to this embodiment, the player need to succeed in the game to save points for increasing the difficulty level, and thus daringly increases the difficulty level by consuming the points by his or her own will, and therefore, increasing the difficulty level itself becomes a status, and this brings a feeling of satisfaction to advanced players.

In addition, according to this embodiment, the player can arbitrarily make a choice whether or not the difficulty level is to be increased, and this makes it possible to give a wide-ranging virtual game to beginners, and the beginners can also enjoy playing the virtual game. Accordingly, this allows a wide variety of players from beginners to advanced players to enjoy playing the virtual game. Thus, the user community playing the virtual game is widened, and the generation which plays the game is widened. Then, this can also contribute to communications between a wide spectrum of users (between generations) through topics in relation to the virtual game.

Furthermore, according to this embodiment, when the difficulty level is increased, the number of obtainable coins in a case that the enemy character is defeated is large, and the probability of obtaining the rare item is raised, and therefore, it is possible to motivate the player to challenge the virtual game with a high difficulty level. Thus, it is possible to enhance fun of the virtual game and interest to the virtual game. It should be noted that such changes in the game element are merely one example, and should not be restricted. For example, by increasing the difficulty level, a new phase and a new map may appear, a new character (enemy character) may appear, and an item which is not useable when the difficulty level is equal to or less than the initial value may be useable. That is, a new game element is added (is made to appear), or right or wrong of the use of the game element may be changed.

In addition, in this embodiment, the difficulty level of the virtual game can also be decreased, and therefore, with the use of the coins obtained by playing the virtual game by advanced players, beginners can decrease the difficulty level to play the same virtual game, for example. That is, the advanced players and the beginners can enjoy playing the virtual game together.

Additionally, in this embodiment, in accordance with the defeat of the enemy character, it is determined that the attack (game) is successful to thereby obtain coins, but there is no need of being restricted thereto. In a case that an attack hits the enemy character, it is determined that the attack (game) is successful to thereby obtain coins in each case. Furthermore, in place of the coins, points and items may be obtained. In such a case, by using the points and the items, the difficulty level may be increased or decreased.

In addition, in this embodiment, the difficulty level is increased from the initial value "2", but the current difficulty level is regarded as a reference from which an increase or a decrease may be made.

Furthermore, in this embodiment, if "continue" is chosen, in a case that the difficulty level is set to equal to or less than the initial value in the immediately preceding virtual game which was over, the difficulty level is maintained, but the difficulty level may be decreased. Here, the difficulty level is never less than 0.

In addition, there may be some areas which cannot be entered unless the difficulty level is equal to or more than a constant level (small areas within the stage). If a precious item is arranged in this area, this becomes a motivation to increase the difficulty level. Also, unless the difficulty level is equal to or more than a constant level, some stages may not be chosen.

Additionally, when the player sets the difficulty level to a constant level or more and clears the stage, the preset number of coins may be obtained.

In addition, clear information is recorded in each stage, and in the clear information, information about the highest difficulty level when the stage is cleared may be recorded. Then, at a time of a stage choice, by proposing this information, the motivation of the player may be enhanced.

Also, in this embodiment, a description is made only on a hand-held type game apparatus, but there is no need of being restricted thereto. For example, this can be applied to other electronic appliances (information processing apparatus), such as a console-type game apparatus, a personal computer, a PDA, and a cellular phone having a game function machine.

Moreover, the configuration of the game apparatus need not be limited to the embodiment. For example, one camera or no camera may be possible. Furthermore, the touch panel may be provided on two LCDs.

In addition, the invention can be applied to a game system in which respective processing for the game processing are distributedly performed by a plurality of computers, etc.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A non-transitory storage medium storing a game program, said game program causes a processor of the game apparatus to function as:
   a success judger which advances a game according to an operation by a player and judges whether the game succeeds;
   a point storage decider which decides a number of points to be awarded to said player and accumulatively stores point data corresponding to the number of awarded points in a storage when said success judger judges that the game succeeds;
   a difficulty level increase acceptor which accepts an operation by the player for increasing a difficulty level of the game prior to start of the game, wherein said operation by the player designates a number amount of points to be used for increasing the difficulty level out of points indicated by the point data; and
   a difficulty level increaser which performs a subtraction from the number of the points indicated by point data stored in said storage, and increases a difficulty level of said game when said difficulty level increase acceptor accepts the operation by the player for increasing the difficulty level of said game, wherein a degree of difficulty of said game is increased depending on the number of the points subtracted.

2. A non-transitory storage medium according to claim 1, wherein
   said game program causes said processor to further function as a game element processor which makes a predetermined game element appear in said game, or raises a possibility of making the predetermined game element appear in said game when said difficulty level increase acceptor accepts an operation by the player for increasing the difficulty level of said game.

3. A non-transitory storage medium according to claim 2, wherein
   said game program causes said processor to further function as:
   a game element obtainment acceptor which accepts an operation by the player for obtaining said game element, and
   a game element use setter which performs a subtraction from the number of points indicated by the point data stored in said storage, and sets said game element to be useable in said game when an operation by the player for obtaining the game element is accepted by said game element obtainment acceptor.

4. A non-transitory storage medium according to claim 1, wherein
   said game program causes said processor to further function as:
   a game-over judger which judges whether a game being played by the player is over;
   a re-playing acceptor which accepts an operation by the player as to whether said game is to be played again when said game-over judger judges that the game is over; and
   a first difficulty level decreaser which decreases the difficulty level of a game to be played again in relation to a difficultly level of a game previously increased by said difficulty level increaser when said re-playing acceptor accepts an operation by the player indicating that the game is to be played again.

5. A non-transitory game program according to claim 1, wherein said game program causes said processor to further function as:
- a difficulty level decrease acceptor which accepts an operation by the player for decreasing the difficulty level of the game prior to a start of said game, and
- a second difficulty level decreaser which performs a subtraction from the number of points indicated by the point data stored in said storage, and decreases the difficulty level of said game when said difficulty level decrease acceptor accepts an operation by the player to decrease the difficulty level of said game.

6. A non-transitory storage medium according to claim 5, wherein
said game program causes said processor to further function as:
- a game-over judger which judges whether a game being played by the player is over;
- a re-playing acceptor which accepts an operation by the player as to whether said game is to be played again when said game-over judger judges that the game is over; and
- a difficulty level adjuster which decreases the difficulty level of the game to be played again when said game for which the difficulty level has been increased by said difficulty level increaser is over, and which does not change the difficulty level of the game to be played again when said game for which the difficulty level has been decreased by said second difficulty level decreaser is over, at a time when said re-playing acceptor accepts an operation by the player indicating that the game is played again.

7. A non-transitory storage medium according to claim 1, wherein
said point storage decider makes a value of the number of points to be given greater as the difficulty level of said game becomes higher.

8. A non-transitory storage medium according to claim 1, wherein
said game program causes said processor to further function as:
- a player character controller which controls an action of a player character according to an operation by the player; and
- an enemy character controller which controls an action of an enemy character, wherein
said success judger judges whether an attack action against said enemy character by said player character controlled by said player character controller is successful, and
said point storage decider decides a value for the number of points, and accumulatively stores point data corresponding to said number of points in said storage when said success judger judges that an attack action against said enemy character by said player character is successful.

9. A non-transitory storage medium according to claim 8, wherein
said game program causes said processor to further function as:
- an experience point storage decider which decides a number of experience points to be given to said player character and accumulatively stores experience point data corresponding to the number of experience points in said storage when said success judger judges that an attack action against said enemy character by said player character is successful,
- a player character experience level increaser which increases an experience level of the player character when the number of experience points indicated by the experience point data stored in said storage becomes equal to or more than a predetermined value, and
- an ability value increaser which increases an ability value of said player character when said experience level increaser increases the experience level of said player character.

10. A non-transitory storage medium according to claim 9, wherein said difficulty level increaser makes a number amount of experience points to be subtracted from said points data greater as said experience level of the player character becomes higher.

11. A non-transitory storage medium according to claim 9, wherein
said difficulty level increaser subtracts the number of points designated by the operation by said player from stored point data, changes a difficulty level depending on said number of points designated, and increases an upper limit of points usable by said player as the experience level of said player character becomes higher.

12. A non-transitory storage medium according to claim 8, wherein
said difficulty level increaser changes at least one of an attribute and a frequency of appearance of said enemy character.

13. A game apparatus, including at least one computer processor, comprising:
- a success judger which, using at least one processor, advances a game according to an operation by a player and judges whether the game succeeds;
- a point storage decider which, using at least one processor, decides a number of points to be given and accumulatively stores point data corresponding to the number of points in a storage when said success judger judges that the game succeeds;
- a difficulty level increase acceptor which accepts an operation by the player for increasing a difficulty level of the game prior to start of the game, wherein said operation by the player designates a number amount of points to be used for increasing the difficulty level out of points indicated by the point data; and
- a difficulty level increaser which performs a subtraction from the number of the points indicated by the point data stored in said storage and increases the difficulty level of said game when said difficulty level increase acceptor accepts the operation by the player for increasing the difficulty level of said game, wherein said difficulty level increaser increases a degree of the difficulty level of said game depending on the number of the points subtracted.

14. A game controlling method executed using an information processing apparatus having one or more digital processor, the method comprising:
(a) advancing, using the one or more digital processor, a game according to an operation by a player and judging whether the game succeeds;
(b) deciding, using the one or more digital processor, a number of points to be given and accumulatively storing point data corresponding to the number of the points in a storage upon judging that the game succeeds;
(c) accepting an operation by the player for increasing a difficulty level of the game prior to start of the game, wherein said operation by the player designates a number amount of points to be used for increasing the difficulty level out of points indicated by said point data; and
(d) performing a subtraction from the number of the points indicated by the point data stored in said storage, and increasing the difficulty level of said game using the one or more processors upon acceptance of an operation for increasing the difficulty level of said game, wherein a degree of the difficulty level of said game increases depending on the number of the points subtracted.

15. A game system comprising:

a processing system, including at least one computer processor, the processing system being configured to:

advance a game according to an operation by a player and judge whether the game succeeds;

decide a number of points to be given and accumulatively store point data corresponding to the number of the points in a storage upon a judgment that the game succeeds;

accept an operation by the player for increasing a difficulty level of the game prior to start of the game, wherein said operation by the player designates a number amount of points to be used for increasing the difficulty level out of points indicated by said point data; and perform a subtraction from the number of the points indicated by the point data stored in said storage, and increase the difficulty level of said game upon acceptance of an operation by the player for increasing the difficulty level of said game, wherein a degree of the difficulty level of said game increases depending on the number of the points subtracted.

* * * * *